(12) United States Patent
Inokuchi et al.

(10) Patent No.: US 11,316,868 B2
(45) Date of Patent: Apr. 26, 2022

(54) INFORMATION VERIFICATION SYSTEM, INFORMATION VERIFICATION DEVICE, METHOD AND PROGRAM

(71) Applicant: NEC Corporation, Tokyo (JP)

(72) Inventors: Masaki Inokuchi, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 16/485,483

(22) PCT Filed: Feb. 24, 2017

(86) PCT No.: PCT/JP2017/007122
§ 371 (c)(1),
(2) Date: Aug. 13, 2019

(87) PCT Pub. No.: WO2018/154713
PCT Pub. Date: Aug. 30, 2018

(65) Prior Publication Data
US 2020/0007558 A1    Jan. 2, 2020

(51) Int. Cl.
*H04L 29/06* (2006.01)
*G06F 16/23* (2019.01)

(52) U.S. Cl.
CPC ........ *H04L 63/123* (2013.01); *G06F 16/2308* (2019.01); *H04L 63/0876* (2013.01); *H04L 63/20* (2013.01)

(58) Field of Classification Search
CPC ... H04L 63/123; H04L 63/0876; H04L 63/20; H04L 9/3273; H04L 9/3284; G06F 16/2308

(Continued)

(56) References Cited

U.S. PATENT DOCUMENTS 10,068,397 B2 * 9/2018 Day .................. H04W 12/08
10,460,118 B2 * 10/2019 Hamel ................ G06F 21/62
2016/0283939 A1   9/2016 Finlow-Bates

FOREIGN PATENT DOCUMENTS

JP    2005-45756 A    2/2005
JP    2005-045757 A   2/2005
(Continued)

OTHER PUBLICATIONS

Back, Adam, "Hashcash—A Dental of Service Counter-Measure", Aug. 1, 2002, <URL: http:www//hashcash.org/papers/hashcash.pdf>, pp. 1-10 (total 10 pages).

(Continued)

*Primary Examiner* — Longbit Chai

(57) ABSTRACT

At least one of nodes included in the second node group comprises a request means (521) for transmitting a request signal including verification information to at least any node of the first node group, and a verification means (522) for verifying response information for the request signal, the verification means determines, regarding the response information, whether or not desired information that is information requested by the request signal or a digest thereof is included, whether or not correct verification information is included, whether or not a value obtained by applying a one-way function to the response information satisfies a predetermined rule, and a response time that is the time taken between the transmission of the request signal and the obtainment of the desired information, and on the basis of the determination results thereof, assesses the presence or absence of reliability of the desired information or the degree of reliability thereof.

12 Claims, 13 Drawing Sheets

(58) Field of Classification Search
USPC .............................................................. 726/1
See application file for complete search history.

(56) References Cited

FOREIGN PATENT DOCUMENTS

| | | |
|---|---|---|
| JP | 2007-153021 A | 6/2007 |
| JP | 2009-169861 A | 7/2009 |

OTHER PUBLICATIONS

International Search Report for PCT/JP2017/007122 dated May 23, 2017 [PCT/ISA/210].
Written Opinion for PCT/JP2017/007122 dated May 23, 2017 [PCT/ISA/237].
Japanese Office Action for JP Application No. 2019-500954 dated Oct. 20, 2020 with English Translation.

\* cited by examiner

INFORMATION VERIFICATION SYSTEM, INFORMATION VERIFICATION DEVICE, METHOD AND PROGRAM

This application is a National Stage Entry of PCT/JP2017/007122 filed on Feb. 24, 2017, the contents of all of which are incorporated herein by reference, in their entirety.

TECHNICAL FIELD

The present invention relates to an information verification system, an information verification device, an information verification method, and an information verification program that evaluate reliability of information held by another device.

BACKGROUND ART

There is a consensus algorithm called a proof of work (PoW). In accordance with the PoW, processing of searching for a value that is set in a section called a nonce included in data so that a value resulting from applying a one-way function to the data satisfies a predetermined rule (hereinafter, simply referred to as processing of searching for a nonce) is performed.

At this time, a hash function may be used as the one-way function, for example. Further, it may be assumed that the rule is defined as "the hash value is equal to or less than a threshold (target value)". In general, the nature of such a one-way function makes it difficult to perform the processing of searching for a nonce efficiently, which in turn forces a device responsible for performing the processing to actually repeat a task of confirming whether the rule is satisfied with the nonce set to a randomly chosen value. A large number of nodes are caused to perform such a task including the setting and confirmation simultaneously, and then a node that have found a nonce satisfying the rule earliest transmits information to the other nodes, thereby causing all the nodes to determine a state of the data including the value of the nonce on the basis of the information (reach a consensus).

An example of a system using the PoW is a distributed ledger system. In particular, there is a distributed ledger system in which a data group including pieces of data that each have a predetermined data structure called a block and are linked to each other (blockchain) serves as a ledger, and the blockchain is shared among and managed by a plurality of nodes.

In such a distributed ledger system, when information to be managed is generated, a block having the information recorded therein is added to the blockchain on an as needed basis. At the time of adding this block, the plurality of nodes reach a consensus using the PoW to allow the information to be shared among the plurality of nodes while showing that the information is highly-reliable information.

The blocks constituting the blockchain each have a nonce where a value is set so that its own block satisfies the predetermined rule, and a section where information based on at least one block located before the own block in the blockchain is stored (hereinafter, referred to as a previous block management section). Hereinafter, in the blockchain, at least one block located before the own block may be collectively referred to as a previous block, and a block located immediately before the own block may be referred to as an immediately previous block. Note that the previous block, more specifically, is a block in which information is recorded before the own block, and the immediately previous block is a block in which information is recorded immediately before the own block.

Each block can hold, for example, a hash value of the information recorded in the immediately previous block as information based on the previous block. Furthermore, each block has a section where some information associated with the own block such as any given information to be managed in the own block is recorded (hereinafter, referred to as an own block data section). In this configuration, during execution of the processing of searching for a nonce, a value to be set as the nonce that causes pieces of information stored in the sections of the own block including the previous block management section, the own block data section, and the nonce to satisfy the predetermined rule in advance is searched for. Hereinafter, a section other than the nonce to which the rule is applied during execution of the processing of searching for a nonce may be referred to as data section of the block. In the above example, a combination of the previous block management section and the own block data section correspond to the data section.

Hereinafter, in the distributed ledger system, a node responsible for the PoW is referred to as a ledger management node. Each ledger management node holds a copy of the blockchain.

When any node desires to record some information in the blockchain (ledger), the node sends the information to the ledger management node. Then, a block is added to the blockchain through the PoW by the ledger management node of the ledger management system.

Specifically, upon receiving the information, the ledger management node generates a block in which the information is stored in the data section (more specifically, the own block data section). Further, a hash value generated on the basis of information stored in at least one block that becomes a previous block after addition of the block is stored in the data section of the block (more specifically, the previous block management section). Thereafter, a nonce that causes the hash value of the block to be equal to or less than the target value is searched for.

Each ledger management node performs the above processing simultaneously, and a ledger management node that has finished the PoW earliest sends, to the other ledger management nodes, the block where the nonce has been set. The ledger management node that has finished the PoW and each ledger management node that has received the block from the ledger management node that has finished the PoW bring their ongoing PoW processing to an end and add the block to an end of the blockchain held by themselves.

Timing at which the PoW is brought to an end changes for each ledger management node, and, in many cases, a block generated by one ledger management node that has finished the PoW is added to the blockchains held by all the ledger management nodes. This causes all the ledger management nodes to have the same chain.

Further, in addition to the above, each ledger management node can verify information included in a block by some method, when generating the block or receiving the block from the ledger management node that has finished the PoW. In accordance with a result of the verification, processing such as generating a block without including information when the information has a problem or preventing a block including the information having a problem from being added to the blockchain is performed.

Such a distributed ledger system that makes use of the PoW not only allows all the ledger management nodes to have the same information but also makes alteration of the ledger difficult. As an example, consider a case where a malicious node attempts to alter a block in the blockchain. In order to prevent the alteration from being detected, it is required that nonces of all blocks after the block, alteration of which has been attempted, be reset. In the above example, for all the blocks after the block, alteration of which has been attempted, it is required that a nonce that causes a hash value to be less than or equal to the target value be searched for and set. This computation generally involves large computational complexity. Further, new blocks may be added even during the search. Therefore, in order to prevent alteration from being detected, it is necessary for such a malicious node to reset nonces faster than a honest ledger management node group, and, even if the malicious node is higher in performance than each ledger management node, it is practically difficult to reset the nonces due to superiority in number of the honest ledger management node group.

In the meantime, for retrieval of information from any node, a method of evaluating reliability of information such as whether the information is legitimate is required. One example of such an evaluation method is a method by which a sender adds authentication information to information and transmits the information, and a receiver verifies legitimacy of the authentication information. This method makes it possible to verify whether alteration has been made on a communication path, but, when the sender is a malicious node, is unable to evaluate legitimacy of information altered by the node.

With regard to a technique for evaluating reliability of information, for example, Patent Literature 1 discloses an example of an authentication system that verifies legitimacy of authentication information on one of a plurality of node devices on the basis of verification information stored in the other node devices. In the authentication system disclosed in Patent Literature 1, a second node requested to verify authentication information on a first node requests a plurality of third nodes to verify the authentication information. Each of the third nodes verifies the authentication information thus received on the basis of the authentication information and the verification information stored in itself and to be used in verification of the legitimacy of the authentication information, and returns the result to the second node. The second node authenticates the first node on the basis of the verification result from each of the third nodes and a weight value indicating reliability of each of the third nodes.

CITATION LIST

Patent Literature

Patent Literature 1: Japanese Patent Application Laid-Open No. 2009-169861

SUMMARY OF INVENTION

Technical Problem

However, the method using the authentication information on the device as described above has a problem that a device that receives information needs to have a capability of verifying the authentication information on a device serving as a transmission source of the information.

Even if a device that acts as a proxy in the verification processing is separately provided as in the method disclosed in Patent Literature 1, another problem arises in that legitimacy of the proxy device needs to be verified. For the verification of the authentication information, in many cases, information associated in advance with a counterpart device is held, so that the verification cannot be applied to a case where the counterpart device is not identified in advance.

The problem is that it is difficult to evaluate the reliability of retrieved information without associating information to be used in authentication in advance with a counterpart device from which the information is retrieved.

With regard to a method of evaluating reliability of information without requiring association of information on the counterpart device, for example, with information to be retrieved shared among a plurality of devices, when the information is retrieved from one of the devices, it is possible to confirm that the information has been approved by a large number of devices and thus has a certain degree of reliability by causing the other devices holding the same information to verify the information.

However, the method by which the device that retrieves the information requests such a large number of devices to verify the information and then receives results of the verification has a problem in that a communication load is getting higher between the device that retrieves the information and the devices that verify the information. For example, consider a case where a second node not included in a first node group retrieves information managed by the first node group. In this case, it is difficult for the second node to determine with a small communication load whether the retrieved information has been verified and approved by a large number of nodes included in the first node group. Note that the communication load corresponds to a communication load between the first node group and the second node.

Note that the above problem occurs not only in the case where the second node requests each node included in the first node group for verification but also the following case. For example, it is assumed that a blockchain of a ledger management system as described above is used as a mechanism for sharing information safely among a plurality of devices. In this case, the PoW performed by a ledger management node can be used as a basis for determining whether any given information has been verified and approved by a large number of nodes. As described above, the ledger management node can verify information included in a block when generating or adding the block. As a result of the verification, information approval of which has failed is removed from the block, or the block itself is discarded. That is, when a malicious node tries to connect a block including invalid information that is not approved by a honest ledger management node to the blockchain, the block is not approved by the honest ledger management node, so that only the malicious node (in this case, a malicious ledger management node) performs the PoW. This causes two blockchains to be present in the network: a valid blockchain through the PoW by honest ledger management nodes, and an invalid blockchain including invalid blocks through the PoW by only malicious ledger management nodes.

At this time, when a total computational capability of the honest ledger management nodes is higher than a total computational capability of the malicious ledger management nodes, the valid blockchain managed by the honest ledger management nodes is higher in frequency of block addition than the invalid blockchain. This is because the honest ledger management node group requires a short time for the PoW on average as compared with an invalid ledger management node group. Therefore, when a node tries to evaluate reliability of information included in the blockchains managed by those ledger management nodes, the node can determine that information included in a longer blockchain has been approved by a larger number of ledger management nodes. In other words, it can be expected that the information included in the longer blockchain has been approved by a larger number of ledger management nodes.

However, when trying to evaluate reliability of information using such a characteristic of the blockchain, a node that receives the information also needs to retrieve the entire blockchain and check a hash value of all blocks. Moreover, the higher reliability of information is, the longer blockchain the node needs to retrieve, which results in a significant communication load for retrieval of some information in the blockchain.

Note that the problems solved by the present invention is not limited to the above problems. Other problems solved by the present invention will also be made clear in the present specification.

The present invention has been made in view of the above-described problems, and it is an object of the present invention to provide an information verification system, an information verification device, an information verification method, and an information verification program that allow an evaluation of reliability of information held by another device with neither an increase in communication load nor association in advance of information on a counterpart device from which the information is retrieved.

Solution to Problem

An information verification system according to the present invention includes a first node group including a plurality of nodes, and a second node group including at least one node, and the at least one of nodes included in the second node group includes a request means configured to transmit a request signal for requesting information, the request signal including verification information that is information for use in verification to be generated each time the request signal is transmitted, to at least any node of the first node group, and a verification means configured to verify response information that is information transmitted from any one of the nodes included in the first node group in response to the request signal, the verification means determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessing the presence or absence of reliability of the desired information or the degree of reliability thereof.

Further, an information verification device according to the present invention is an information verification device configured to determine reliability of information managed by a first node group including a plurality of nodes, and includes a verification means configured to verify response information that is information transmitted from any one of the nodes included in the first node group in response to a request signal transmitted to at least any node of the first node group, the request signal being for requesting information and including verification information that is information for use in verification to be generated each time the request signal is transmitted, the verification means determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and at least the information verification device, and a response time that is a time taken between the transmission of the request signal and the obtainment of the desired information, and on the basis of the determination results thereof, assessing the presence or absence of reliability of the desired information or the degree of reliability thereof.

Further, an information verification method according to the present invention is a method of causing a node included in a second node group different from a first node group including a plurality of nodes to determine reliability of information managed by the first node group, and includes causing the node included in the second node group to verify response information that is information transmitted from any one of the nodes included in the first node group in response to a request signal transmitted to at least any node of the first node group, the request signal being for requesting information and including verification information that is information for use in verification to be generated each time the request signal is transmitted. In the verifying response information, determinations are made of whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessment is made of the presence or absence of reliability of the desired information or the degree of reliability thereof.

Further, an information verification program according to the present invention is a program of causing a node included in a second node group different from a first node group including a plurality of nodes to determine reliability of information managed by the first node group, and causes a computer included in the node included in the second node group to execute verification processing of verifying response information that is information transmitted from any one of the nodes included in the first node group in response to a request signal transmitted to at least any node of the first node group, the request signal being for requesting information and including verification information that is information for use in verification to be generated each time the request signal is transmitted. In the verification processing, regarding the response information, determinations are made of whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessment is made of the presence or absence of reliability of the desired information or the degree of reliability thereof.

Advantageous Effects of Invention

According to the present invention, it is possible to evaluate the reliability of information held by another device with neither an increase in communication load nor association in advance of information on a counterpart device from which the information is retrieved.

DESCRIPTION OF EMBODIMENTS

Hereinafter, a description will be given of exemplary embodiments of the present invention with reference to the drawings. Note that each exemplary embodiment in the following description is an illustrative example, and can be implemented individually or in suitable combination.

First Exemplary Embodiment

Figure 1:
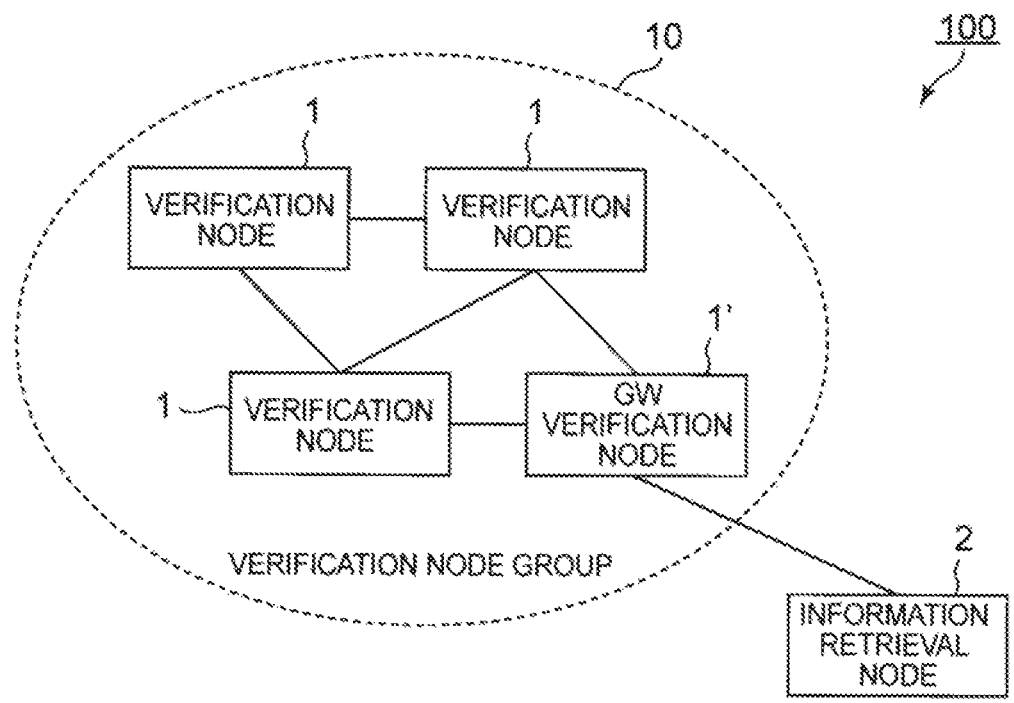
FIG. 1 is an explanatory diagram schematically showing a configuration of an information verification system of a first exemplary embodiment.

FIG. 1 is an explanatory diagram schematically showing a configuration of an information verification system of a first exemplary embodiment. An information verification system 100 of the present exemplary embodiment includes a verification node group 10 including a plurality of verification nodes 1 and at least one information retrieval node 2. According to present exemplary embodiment, the verification node group 10 serves as a group including nodes that share and manage information desired by the information retrieval node 2. Note that the verification node group 10 may be considered a group including nodes capable of at least verifying legitimacy of the information managed by the group.

In the present example, each of the verification nodes 1 and the information retrieval node 2 have a communication means, and are connected to a communication network and thus capable of communicating with each other. Further, in the verification node group 10, the verification nodes 1 are connected to each other directly or indirectly via another verification node 1 and thus capable of communicating with each other. Note that it is sufficient that the information retrieval node 2 can communicate with at least one of the verification nodes 1. Note that FIG. 1 is merely an illustrative example, and the number of verification nodes and information retrieval nodes is not limited to the number shown in FIG. 1. Further, a verification node 1 that has received an information retrieval request from the information retrieval node 2 may be hereinafter referred to as a gateway (GW) verification node 1'.

A description will be given of a method according to the present exemplary embodiment of causing the information retrieval node 2 to determine whether information shared and managed by the verification nodes 1 in the verification node group 10 and retrieved by the information retrieval node 2 satisfies a predetermined condition for reliability evaluation. Hereinafter, information to be requested from the information retrieval node 2 to any one of the verification nodes 1 is referred to as desired information. Further, information that satisfies the predetermined condition for reliability evaluation is referred to as highly-reliable information. The predetermined condition may be, for example, a condition that whether at least a predetermined number of verification nodes 1 have given their approval.

Figure 2:
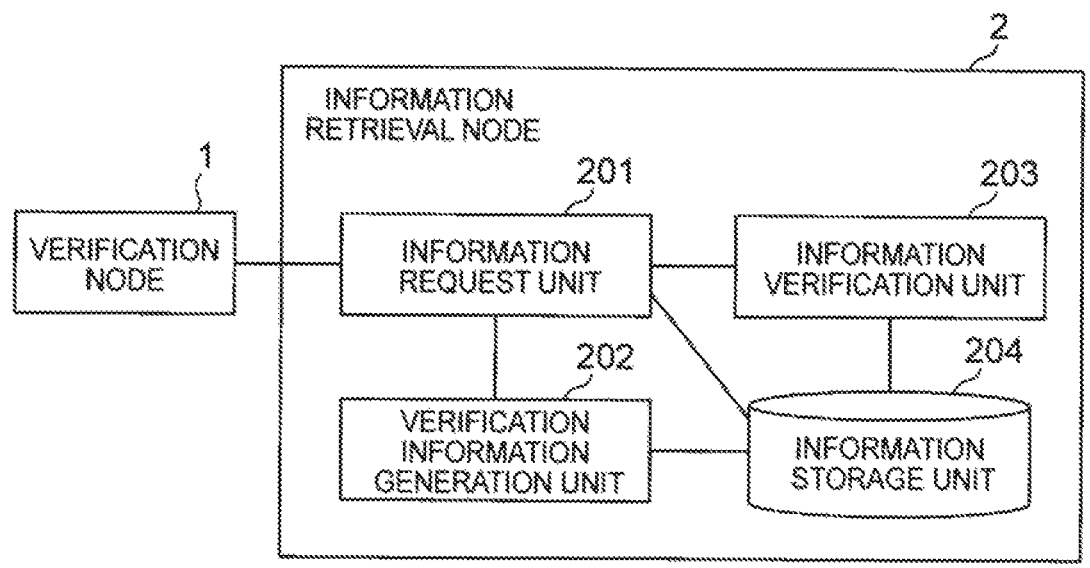
FIG. 2 is a block diagram showing an exemplary configuration of an information retrieval node 2 of the first exemplary embodiment.

FIG. 2 is a block diagram showing an exemplary configuration of the information retrieval node 2. As shown in FIG. 2, the information retrieval node 2 may include an information request unit 201, a verification information generation unit 202, an information verification unit 203, and an information storage unit 204.

The information request unit 201 issues a request for information to any one of the verification nodes 1 and receives a block including the information thus requested (desired information) from the any one of the verification nodes 1.

Figure 3:
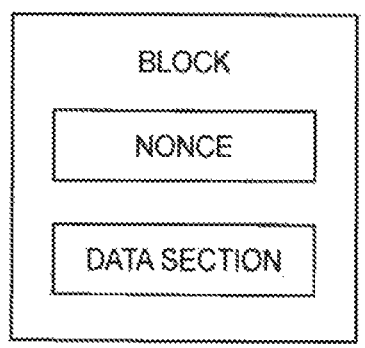
FIG. 3 is an explanatory diagram showing a data structure of a block.

FIG. 3 is an explanatory diagram showing a data structure of the block. According to the present exemplary embodiment, a data structure having at least a section called a nonce and a section for storing any given data (data section) as shown in FIG. 3 is referred to as a "block". Although a method of generating the block will be described later, the desired information can be put in the data section of the block.

More specifically, the information request unit 201 transmits an information retrieval request signal including at least verification information to be used in verification of the desired information and information that can identify the desired information (such as an identifier of the desired information) to any one of the verification nodes 1. Further, the information request unit 201 stores transmission time information representing a time when the information retrieval request signal is transmitted, and the verification information included in the information retrieval request signal in the information storage unit 204. Further, upon receiving a block including the desired information from any one of the verification nodes 1, the information request unit 201 sends the block to the information verification unit 203.

More specifically, the verification information is information to be used in confirmation whether a drawing task of the nonce in the block transmitted from the verification node 1 has been performed after the transmission of the information retrieval request.

The verification information generation unit 202 generates the verification information to be included in the information retrieval request signal. The verification information generation unit 202 preferably generates, as the verification information, information that changes for each information retrieval request signal and whose change is irregular. For example, the verification information generation unit 202 may generate the verification information on the basis of a random number generated from a seed corresponding to a clock of the information retrieval node 2. Note that the verification information is not limited to such information generated on the basis of a random number. For example, in a second exemplary embodiment to be described later, another example of the verification information will be given.

The information verification unit 203 verifies the desired information included in the block received from the verification node 1. The information verification unit 203 verifies the desired information on the basis of the block thus received and the information stored in the information storage unit 204. More specifically, the information verification unit 203 verifies the desired information on the basis of the following determination conditions.

(A1) The block includes the desired information specified by the information retrieval request;
(A2) The block includes information that matches the verification information stored in the information storage unit 204;
(A3) The block satisfies a predetermined rule defined for common use with the verification node group 10; and
(A4) The block has been received within a predetermined time after the transmission of the information retrieval request signal.

The information verification unit 203 confirms each of the above items, and determines that the desired information received is highly-reliable information when all the items are satisfied. Note that the above items will be described later.

The information storage unit 204 holds various types of information. For example, the information storage unit 204 holds contents of the information retrieval request signal, the transmission time information, and the verification information. The information storage unit 204 may hold, for example, the transmission time information and the verification information associated with the information that can identify the desired information.

Figure 4:
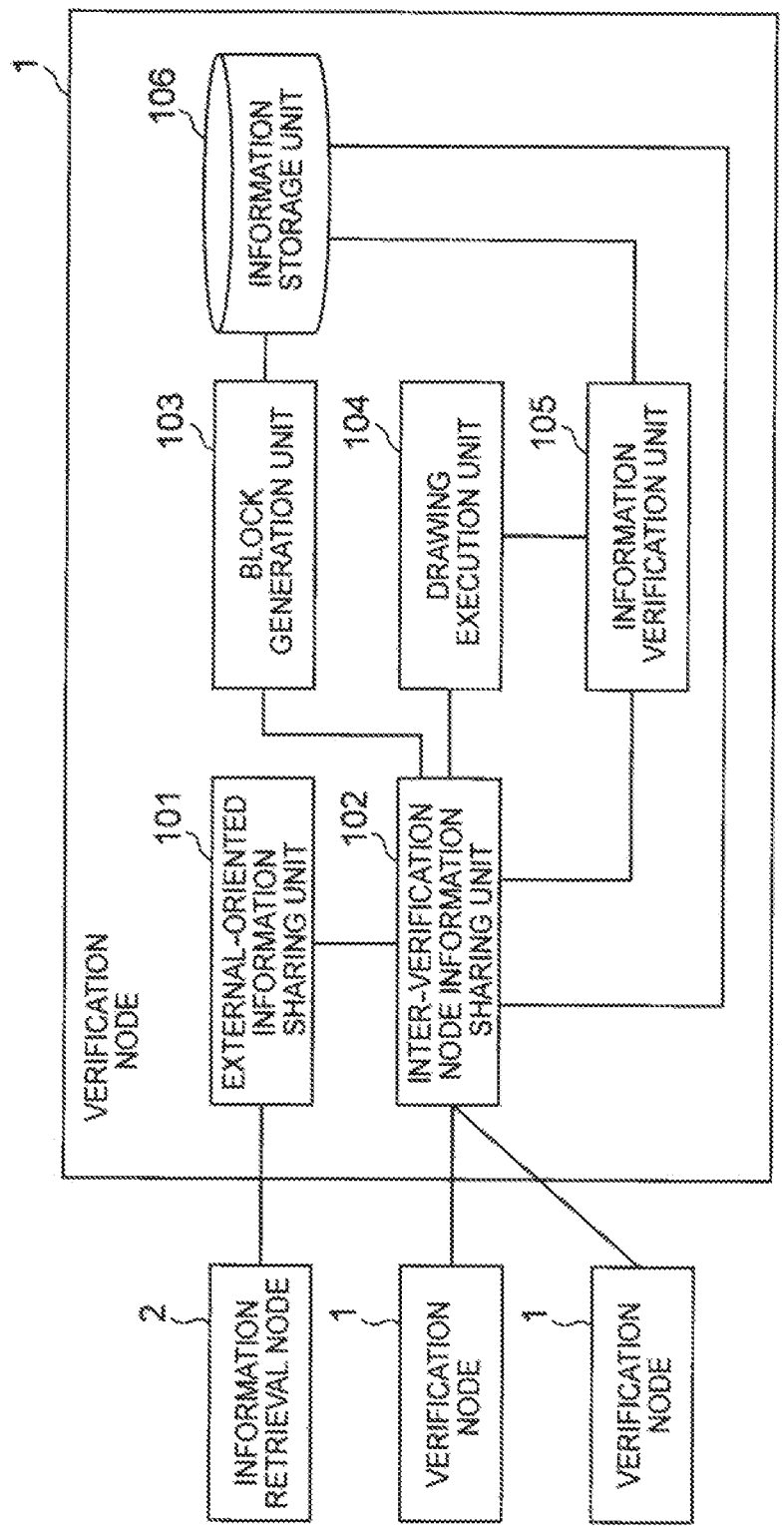
FIG. 4 is a block diagram showing an exemplary configuration of a verification node 1 of the first exemplary embodiment.

FIG. 4 is a block diagram showing an exemplary configuration of each of the verification nodes 1. As shown in FIG. 4, the verification node 1 may include an external-oriented information sharing unit 101, an inter-verification node information sharing unit 102, a block generation unit 103, a drawing execution unit 104, an information verification unit 105, and an information storage unit 106. Note that a relation between functional units is represented by a solid line, but such a relation is merely an illustrative example and is not limited thereto.

The external-oriented information sharing unit 101 is responsible for exchanging information with the information retrieval node 2. More specifically, the external-oriented information sharing unit 101 receives the information retrieval request from the information retrieval node 2.

Upon receiving the information retrieval request, the external-oriented information sharing unit 101 sends information representing the contents of the request to the inter-verification node information sharing unit 102 so as to share the contents of the request among the verification nodes in the group. Hereinafter, for the sake of simplicity, the information to be shared among the verification nodes is also referred to as an information retrieval request. Note that the information retrieval request received from the information retrieval node 2 may be shared as it is among the verification nodes 1, or alternatively, information that results from partially altering or deleting the information retrieval request received from the information retrieval node 2, or adding new information to the information retrieval request may be shared among the verification nodes.

Further, upon receiving a response block from the inter-verification node information sharing unit 102, the external-oriented information sharing unit 101 transmits the response block to the information retrieval node 2. Herein, the response block is a block serving as a response to the information retrieval request, and has an appropriate value set in the nonce and satisfies a condition for verification made by the information verification unit 105.

The inter-verification node information sharing unit 102 is responsible for exchanging information with the verification nodes in the verification node group 10 to which its own node is included. More specifically, the inter-verification node information sharing unit 102 transmits on an as-needed basis, to the other verification nodes, the information retrieval request sent from the external-oriented information sharing unit 101, a block already subjected to drawing and sent from the drawing execution unit 104 to be described later, and such pieces of information received from the other verification nodes.

Note that the inter-verification node information sharing unit 102 transfers, on an as-needed basis, these pieces of information to the other verification nodes to allow all the verification nodes in the group to share these pieces of information as much as possible. Many specific information sharing algorithms are available, and, as a simple method, flooding may be used for information sharing. For example, when the inter-verification node information sharing unit 102 of one verification node 1-A receives, from another verification node 1-B, a signal that the inter-verification node information sharing unit 102 has never transferred, the inter-verification node information sharing unit 102 transfers the signal to an adjacent verification node 1-C. Each of the verification nodes 1 performs the above processing to allow the signal to be sent to all the verification nodes 1. Note that all the verification nodes in the verification node group 10 need not necessarily share information such as the information retrieval request or the response block. It is preferable that such information be transferred to all the verification nodes in order to prove that the information is highly reliable, but, as long as the information is transferred to a larger number of verification nodes 1, any transfer method may be used.

At this time, information on a verification node 1 serving as a transfer destination can be obtained, for example, by the following method. That is, information on all verification nodes 1 that have the desired information is made public by a specific server or the like, and the information retrieval node 2 or each of the verification nodes 1 accesses the server to retrieve necessary information. Further, for example, to the information retrieval node 2 and each of the verification nodes 1, topology information on the information verification system 100 such as information on addresses of the information retrieval node 2, the GW verification node, and the other verification nodes 1 may be given in advance as configuration information. Further, the verification nodes 1 can recognize each other by a method similar to a technology applied to the existing peer to peer (P2P) network.

Typically, such acquisition of information on the transfer destination node can be made by causing each of the verification nodes 1 to have information (verification node list) on all the other verification nodes 1 in the verification node group 10. In this configuration, when a new verification node is added to the verification node group, the verification node list is managed such that the new verification node acquires the list from any of the verification nodes included in the group and transmits information on its own node to all the verification nodes that have been registered in the list to add its own node to the list. Further, each of the verification nodes need not necessarily hold the information on all the other verification nodes. As a simple example, each of the verification nodes may hold information on the next node on a transfer path. As another example, each of the verification nodes may hold information on (an address of) at least one adjacent verification node. Further, the information retrieval node 2 can acquire information on a verification node serving as a request destination by the same method as described above.

Further, the inter-verification node information sharing unit 102 starts processing in its own node in response to the information retrieval request transmitted from the information retrieval node 2 or another verification node 1. More specifically, upon receiving the information retrieval request from the information retrieval node 2 or another verification node 1 via the external-oriented information sharing unit 101, the inter-verification node information sharing unit 102 sends the request to the block generation unit 103 to cause the block generation unit 103 to generate a block that is a response to the request. Further, the inter-verification node information sharing unit 102 holds the contents of the request in the information storage unit 106.

Although the details will be described in the description of the operation, the block is generated by the block generation unit 103 on the basis of the information retrieval request thus sent, and the drawing execution unit 104 of each of the verification nodes 1 performs a task of searching for a nonce simultaneously. Further, the contents of the information retrieval request stored in the information storage unit 106 are used in verification of the block by the information verification unit 105.

Further, upon receiving a block that is a response to the information retrieval request and has a nonce set therein (hereinafter, referred to as a response block candidate) from another verification node 1, the inter-verification node information sharing unit 102 causes the information verification unit 105 to verify the response block candidate to determine whether to approve or reject the response block candidate. When it is determined that the response block candidate has been approved, the inter-verification node information sharing unit 102 notifies the drawing execution unit 104 of the end of the drawing. On the other hand, when it is determined that the response block candidate has been rejected, the inter-verification node information sharing unit 102 discards the response block candidate. Further, in such a case, the inter-verification node information sharing unit 102 may avoid transferring the response block candidate to another verification node 1. The response block candidate approved by the information verification unit 105 serves as a legitimate response block in its own node.

Further, when the response block candidate received from another verification node 1 is approved by the information verification unit 105 to become a response block, the inter-verification node information sharing unit 102 sends the response block to the external-oriented information sharing unit 101 when its own node serves as a GW verification node 1'. The response block is then transmitted by the external-oriented information sharing unit 101 to the information retrieval node 2.

Note that the inter-verification node information sharing unit 102 performs the same processing not only on the response block candidate received from another verification node 1 but also on a response block candidate that is generated by its own node, has a nonce set therein, and is approved by the information verification unit 105 to become a response block. Note that, in the latter case, the inter-verification node information sharing unit 102 may avoid causing the information verification unit 105 to perform the verification processing on the response block candidate.

The block generation unit 103 generates, on the basis of the information retrieval request sent from the inter-verification node information sharing unit 102, a block that is a response to the request. More specifically, the block generation unit 103 generates a block including, in the data section, at least the contents of the information retrieval request and the desired information stored in the information storage unit 106. Further, the block generation unit 103 sends the block thus generated to the drawing execution unit 104 via the inter-verification node information sharing unit 102. Note that the block generation unit 103 may also send the block directly to the drawing execution unit 104.

The block generation unit 103 generates a block as described above, thereby ensuring that the block held by each of the verification nodes 1 includes the contents of the information retrieval request and the desired information.

The drawing execution unit 104 is responsible for setting an appropriate nonce in the block generated by the block generation unit 103, the block being a response to the information retrieval request. Herein, the nonce is set such that the block satisfies the predetermined rule.

For example, a nonce that causes a value resulting from applying a hash function such as secure hash algorithm 256-bit (SHA-256) to a whole block to fall within a predetermined range can be set. Herein, it should be noted that when the data section of the block is altered, the hash value of the block changes significantly. That is, once a nonce is set in a block, it is necessary for a malicious node to reset the nonce of the block in order to prevent the alteration from being detected. This contributes to the difficulty of altering data in the block.

Further, since it is generally impossible to efficiently search for a nonce that causes a value resulting from applying such a hash function to a whole block to fall within the predetermined range, a task of confirming whether the rule is satisfied is repeated while changing a nonce value and then actually computing a hash value. This processing may be considered drawing involving computation. According to the present exemplary embodiment, the task of searching for a nonce by the drawing execution unit 104 is referred to as a drawing task.

The method of setting a nonce by the drawing execution unit 104 is not limited to the above-described example as long as the method has a feature as the drawing involving computation. In other words, any method may be employed as long as finding a nonce that satisfies the rule efficiently is difficult and requires large computational complexity (typically, a degree that the nonce can be found only with efficiency equivalent to efficiency in a brute force manner), and a confirmation that a block having any given nonce set therein satisfies the rule can be made with small computational complexity (typically, a degree that the confirmation can be made within a predetermined time). For example, a method by which a one-way function other than the hash function is applied to the block or a method by which a value that results from applying any given one-way function includes a predetermined bit string may also be employed. Note that the probability of finding a nonce value satisfying the rule (probability of succeeding in drawing) may be changed depending on how the rule is determined. This makes it possible to change a time required for the task of searching for a nonce satisfying the rule.

A time until the drawing on a block having the same content succeeds is determined depending on the number of nodes performing the task of searching for a nonce simultaneously and the rule. This makes it possible to estimate the number of nodes performing the task from a time taken for the drawing. During the verification of the desired information by the information retrieval node 2 described above, it is determined, on the basis of the above fact, whether the desired information retrieved is highly-reliable information (see item (A4) of the above determination conditions).

Further, upon finding a nonce value satisfying the predetermined rule, the drawing execution unit 104 sets the nonce value in a block generated by the block generation unit 103 and sends, to the inter-verification node information sharing unit 102, the block as a response block candidate. Then, the drawing task is brought to an end. Further, even when the drawing execution unit 104 has not found a nonce and has been notified of the end of the drawing task (or reception of the response block) from the inter-verification node information sharing unit 102, the drawing task is brought to an end.

The information verification unit 105 verifies the information in the block (response block candidate) sent from the inter-verification node information sharing unit 102 on the basis of the information stored in the information storage unit 106. More specifically, the information verification unit 105 verifies the response block candidate on the basis of the following determination conditions.
(B1) The desired information in the block matches the desired information stored in the information storage unit 106 of the own node;
(B2) The information retrieval request included in the block matches the information stored in the information storage unit 106 of the own node;
(B3) The desired information that is a response to the information retrieval request is stored in the block; and
(B4) The nonce satisfying a determined rule is set in the block.

The information verification unit 105 confirms each of the above items (B1) to (B4), and approves the block when all the items are satisfied, and reject approval of the block when at least any one of the items is not satisfied. The verification result from the information verification unit 105 is notified to the inter-verification node information sharing unit 102.

The information storage unit 106 holds various types of information. For example, the information storage unit 106 holds information (desired information) to be requested from the information retrieval node 2 and the contents of the information retrieval request. Note that it is assumed that all the verification nodes hold the same desired information. The desired information stored in the information storage unit 106 is accessed during execution of the block generation processing by the block generation unit 103 or the block verification processing by the information verification unit 105. Note that a storage timing of the desired information is not limited to a particular timing. Further, the contents of the information retrieval request are stored in the information storage unit 106 by the inter-verification node information sharing unit 102, and is accessed during execution of the block verification processing by the information verification unit 105.

Hereinafter, a supplementary description will be given of the verification processing on the desired information by the information verification unit 203 while showing a relation with the operation of each of the verification nodes 1.

The information verification unit 203 confirms whether the desired information specified by the information retrieval request is present in a received block, as described in the above item (A1). This may be performed by, for example, determining whether the received block includes the desired information that is identified by information identifying the desired information specified by the information retrieval request stored in the information storage unit 204. Further, for example, when the desired information itself includes the information identifying the desired information such as an identifier of the desired information, the confirmation may be performed by determining whether a section of the received block where the desired information is stored includes information having the same identifier as an identifier specified by the information retrieval request stored in the information storage unit 204. Note that the information verification unit 105 performs the same determination on the basis of the above item (B3). In this case, the "received block" may be read as the "response block candidate", and the "information storage unit 204" may be read as the "information storage unit 106".

Further, the information verification unit 203 confirms whether the verification information in the received block matches the verification information in the information storage unit 204, as described in the item (A2). As described above, the verification information generated by the verification information generation unit 202 is transmitted to any one of the verification nodes 1 (more specifically, the GW verification node 1') as a part of the information retrieval request via the information request unit 201 and is, at the same time, stored in the information storage unit 204. Then, the contents of the information retrieval request transmitted to the GW verification node 1' are stored together with the desired information in the block generated by the GW verification node 1' and then shared among the verification nodes 1. Thereafter, when any one of the verification nodes 1 succeeds in drawing a nonce for the block, and the block is approved through the verification processing on the block, the block is sent to the information retrieval node 2 as a response block. Therefore, normally, the verification information included in the block to be received by the information retrieval node 2 matches the verification information stored in the information storage unit 204. When the pieces of verification information do not match each other, it is not guaranteed that the drawing task has been performed by the group of the verification nodes 1 after the transmission of the information retrieval request. Therefore, such a case prevents the desired information stored in the received block from being determined to be highly-reliable information.

Further, the information verification unit 203 confirms whether the received block satisfies the predetermined rule defined for common use with the verification node group 10, as described in the above item (A3). Herein, the predetermined rule is, more specifically, a rule to determine that the drawing succeeds in the drawing execution unit 104 of each of the verification nodes 1. That is, as the above item (A3), the same confirmation as the above item (B4) may be performed. More specifically, the information verification unit 203 may confirm whether a value that results from applying a one-way function to the received block satisfies the determined rule. It is assumed that to which section of the block the one-way function is applied is predetermined between the verification node group 10 and the information retrieval node 2, but the section includes at least the section where the desired information is stored, the section where the verification information is stored, and the nonce.

Further, as described in the above item (A4), the information verification unit 203 confirms whether the block has been received within a predetermined time after the transmission of the information retrieval request signal. As described above, the information request unit 201 stores the transmission time information on the information retrieval request in the information storage unit 204. This allows the information verification unit 203 to access, upon receiving the block, the transmission time information to obtain a difference from the current time, that is, a reception time of the block and thereby confirm whether the block has been received within the predetermined time after the transmission of the information retrieval request signal.

The above predetermined time may be determined on the basis of the nature of the desired information. For example, the larger a degree of influence when the desired information is altered is, the shorter the above predetermined time may be set. This makes it possible to determine that, only when the block is retrieved within a shorter time, the block is highly-reliable information. Herein, the degree of influence when the desired information is altered may be set by a user of the information retrieval node 2, or alternatively may be determined on the basis of an owner of the desired information or an application that uses the desired information.

Further, to be more specific, the degree of influence may be read as attribute information on the desired information. Examples of the attribute information on the desired information include the following:

Size of information;

Date and time at which information is generated (for example, the newer the information is, the higher importance becomes);

Attribute value assigned, by a user, to each information content (such as a keyword);

Attribute value assigned, by the user, to each information category (such as a classification code);

Information on a creator, owner, or requester of information;

Attribute value assigned to each requesting application; and

Whether information is data or control information (for example, whether information is data plane information or control plane information).

Note that, for the information of a creator, owner or requester of information, for example, a separate database of user information is prepared, and the higher the user's position (such as a priority or a job title) is, the higher the importance of the information to be retrieved by the user becomes. Further, information to be retrieved by a user who can access more pieces of information may be considered of a higher importance with reference to access control information on the user.

According to the present exemplary embodiment, the block generated by the GW verification node 1' is subjected to the processing of searching for a nonce that satisfies the predetermined rule by the drawing execution unit 104 of each of the verification nodes 1. That is, the processing of searching for a nonce for the block is performed simultaneously by the plurality of verification nodes 1 that are responsible for approving the information included in the block. Therefore, it is expected that the larger the number of verification nodes 1 responsible for approving the information is, the faster the drawing is finished. Accordingly, it can be expected that the desired information included in the block retrieved in a shorter time after the transmission of the information retrieval request to any one of the verification nodes 1 has been verified by a larger number of groups of verification nodes 1.

Note that, in the above description, during execution of the verification processing on the desired information by the information verification unit 203, it is determined which of two levels representing whether the desired information is highly-reliable information is returned, but another method may be employed. For example, in a case where all the other conditions are satisfied, the information verification unit 203 can determine, instead of item (A4), that, with a time taken from the transmission of the information retrieval request to the reception of the block considered a degree of reliability of the desired information retrieved, the shorter the time is, the higher the reliability of the information becomes. This configuration allows the information verification unit 203 to output the degree of reliability together with the desired information thus retrieved.

According to the present exemplary embodiment, the information request unit 201, the verification information generation unit 202, and the information verification unit 203 are implemented with, for example, an information processing device that operates in accordance with a program, such as a CPU included in a computer operating as the information retrieval node 2. Further, the information storage unit 204 is implemented with, for example, a storage device included in the computer operating as the information retrieval node 2. Further, the external-oriented information sharing unit 101, the inter-verification node information sharing unit 102, the block generation unit 103, the drawing execution unit 104, and the information verification unit 105 are implemented with, for example, an information processing device that operates in accordance with a program, such as a CPU included in a computer operating as each of the verification nodes 1. Further, the information storage unit 106 is implemented with, for example, a storage device included in the computer operating as each of the verification nodes 1.

Next, a description will be given of an operation according to the present exemplary embodiment with reference to FIG. 5 to FIG. 8.

Figure 5:
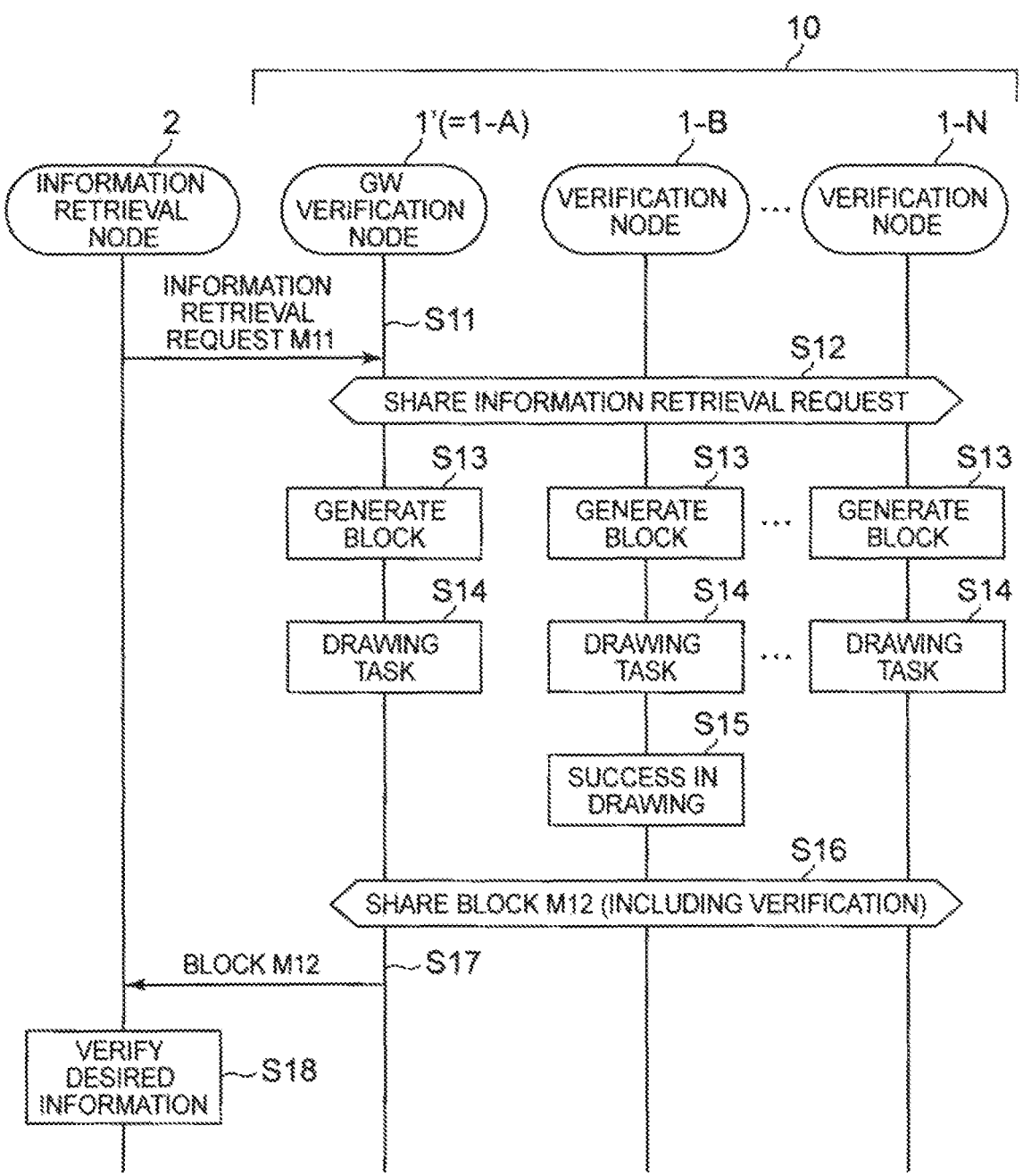
FIG. 5 is a flowchart showing an example of an overall operation of the information verification system of the first exemplary embodiment.

First, with reference to FIG. 5, a description will be given of an overall operation of the information verification system of the present exemplary embodiment. FIG. 5 is a sequence diagram showing an example of the overall operation of the information verification system 100 of the present exemplary embodiment. The example shown in FIG. 5 is an example where the verification node 1-A operates as the GW verification node 1', and the verification node 1-B succeeds in the drawing.

In the example shown in FIG. 5, the information retrieval node 2 first transmits an information retrieval request M11 to the verification node 1-A serving as the GW verification node 1' (step S11). The verification node 1-A transfers the information retrieval request M11 to the other verification nodes 1 to cause the information retrieval request to be shared within the verification node group 10 (step S12).

Upon receiving the information retrieval request M11, each of the verification nodes 1 generates a block including contents of the information retrieval request M11 and desired information thus requested (step S13).

Next, each of the verification nodes 1 performs processing of searching for a nonce for the block thus generated (drawing task) (step S14). In the present example, it is assumed that the verification node 1-B succeeds in the drawing (step S15). The verification node 1-B brings the drawing task to an end and transfers, to the other verification nodes 1, a block M12 (response block candidate) for which the drawing has succeeded, that is, the block M12 generated in step S13 and having an appropriate nonce set therein to cause the block M12 to be shared within the verification node group 10 (step S16).

In step S16, upon receiving the block M12 from another verification node 1, each of the verification nodes 1 brings the drawing task to an end when approving the block through verification of the block.

After bringing the drawing task to an end, the verification node 1-A serving as the GW verification node 1' transmits the block M12 thus verified to the information retrieval node 2 (step S17).

Upon receiving the block M12, the information retrieval node 2 verifies whether the desired information included in the block M12 is highly-reliable information (step S18).

Figure 6:
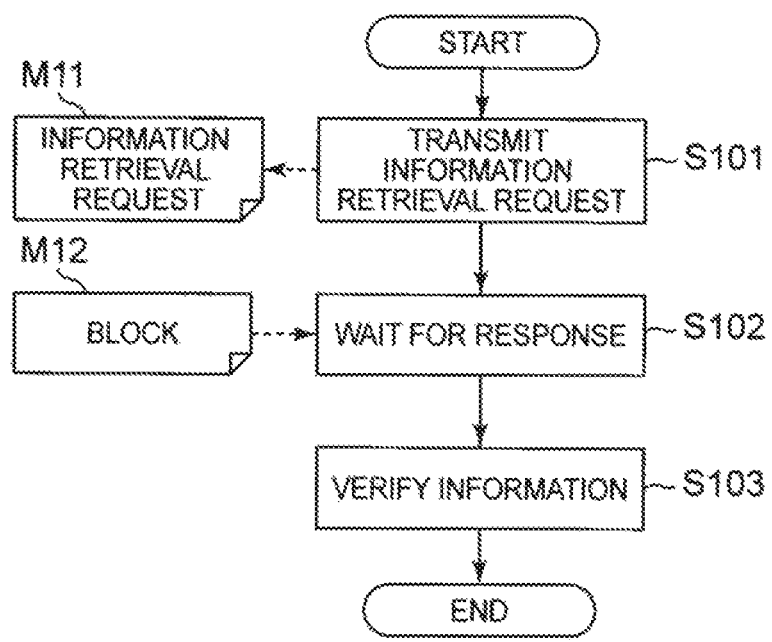
FIG. 6 is a flowchart showing an example of an operation of the information retrieval node 2 of the first exemplary embodiment.

Next, a description will be given in detail of an operation of each node. FIG. 6 is a flowchart showing an example of an operation of the information retrieval node 2. According to the present exemplary embodiment, the information retrieval node 2 transmits the information retrieval request to any one of the verification nodes 1 included in the verification node group 10 to start an information verification operation.

The information retrieval node 2 first performs information retrieval request transmission processing (step S101). During execution of this processing, the verification information generation unit 202 first generates verification information. Next, the information request unit 201 generates an information retrieval request M11 including the verification information thus generated and information that can identify the desired information, and transmits the information retrieval request M11 to any one of the verification nodes 1 included in the verification node group 10. Further, at this time, the information request unit 201 stores, in the information storage unit 204, transmission time information representing a time when the information retrieval request M11 has been transmitted, and the verification information included in the information retrieval request M11.

Thereafter, the information retrieval node 2 performs wait-for-response processing (step S102). During execution of this processing, the information retrieval node 2 waits until receiving, from any one of the verification nodes 1 included in the verification node group 10, a block M12 that is a response to the information retrieval request transmitted in step S101.

Upon receiving the block M12, the information verification unit 203 of the information retrieval node 2 performs verification processing on the desired information (step S103). During execution of this processing, the information verification unit 203 verifies whether the desired information included in the block M12 thus received is highly-reliable information and outputs the result. The details of the verification method are as described above.

Figure 7:
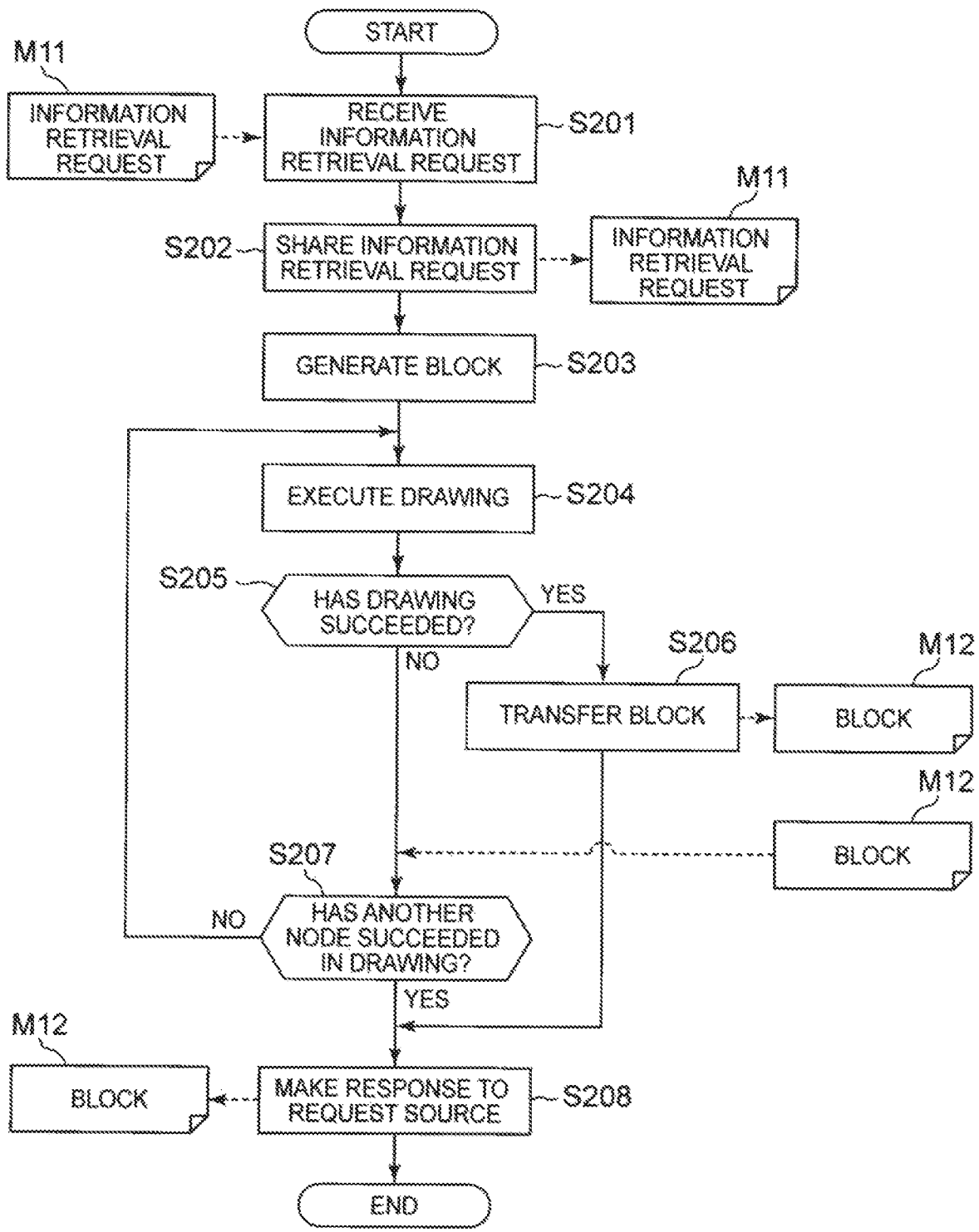
FIG. 7 is a flowchart showing an example of an operation of a GW verification node 1' of the first exemplary embodiment.
Figure 8:
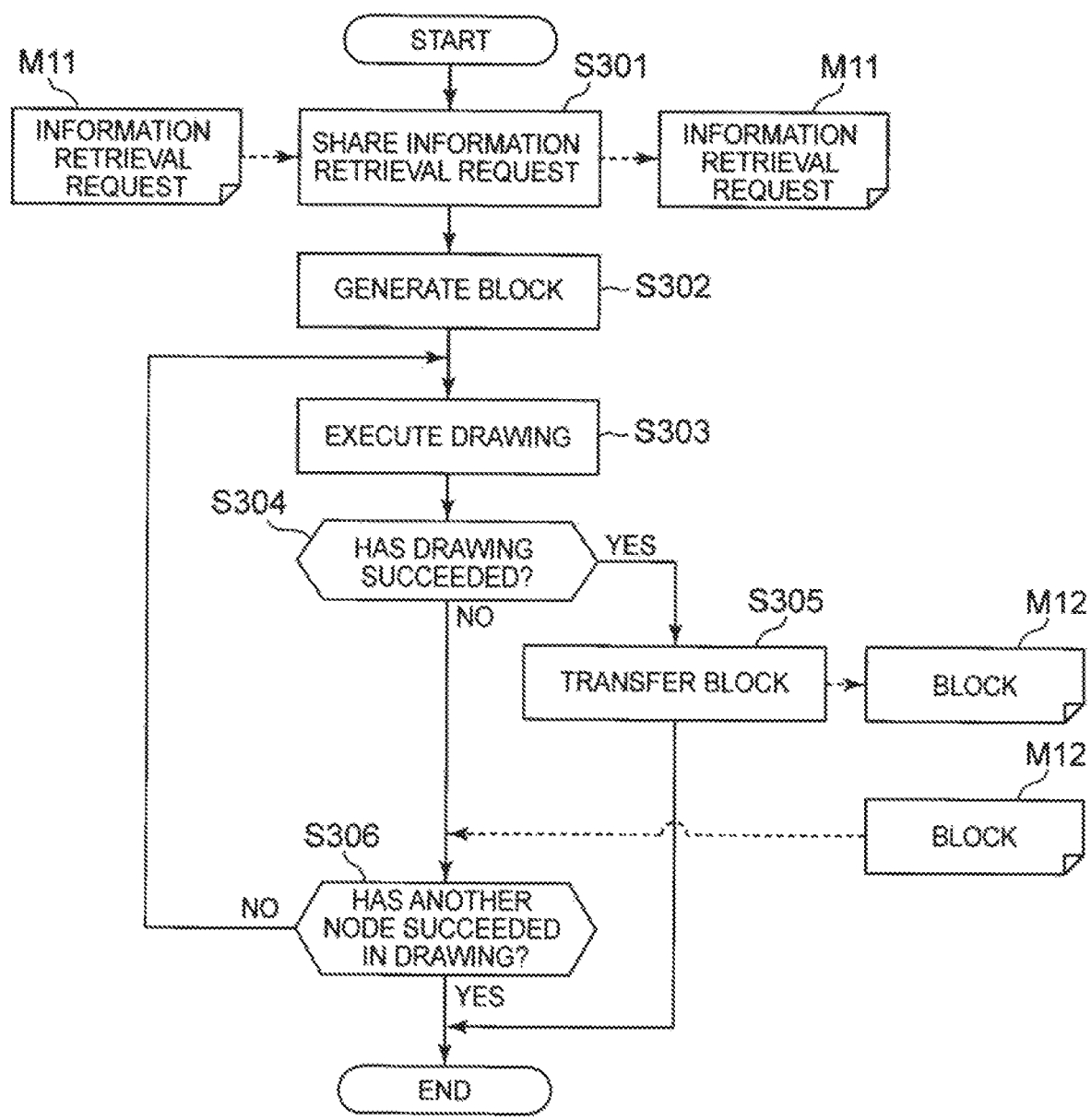
FIG. 8 is a flowchart showing an example of an operation of another verification node 1 of the first exemplary embodiment.

Next, a description will be given of the operation of each of the verification nodes 1. FIG. 7 is a flowchart showing an example of an operation of the GW verification node 1' configured to receive the information retrieval request from the information retrieval node 2. FIG. 8 is a flowchart showing an example of an operation of a verification node 1 other than the GW verification node 1'. Operations in step S301 to step S306 shown in FIG. 8 are the same as the operations in step S202 to step S207 shown in FIG. 7, and thus only a brief description will be given of such operations.

As shown in FIG. 7, the GW verification node 1' first performs information retrieval request reception processing (step S201). During execution of this processing, the external-oriented information sharing unit 101 receives the information retrieval request M11 transmitted from the information retrieval node 2. Further, the external-oriented information sharing unit 101 sends the information retrieval request M11 thus received to the inter-verification node information sharing unit 102.

Upon receiving the information retrieval request M11, the inter-verification node information sharing unit 102 performs information retrieval request sharing processing (step S202). During execution of this processing, the inter-verification node information sharing unit 102 transfers the information retrieval request M11 to the other verification nodes 1 and stores the information retrieval request M11 in the information storage unit 106. Further, the inter-verification node information sharing unit 102 notifies the block generation unit 103 of the reception of the information retrieval request M11.

Upon being notified of the reception of the information retrieval request M11, the block generation unit 103 performs block generation processing (step S203). During execution of this processing, the block generation unit 103 generates a block on the basis of contents of the information retrieval request M11 thus notified. Further, the block generation unit 103 sends the block thus generated to the drawing execution unit 104.

The drawing execution unit 104 to which the block has been sent performs drawing execution processing (step S204). During execution of this processing, the drawing execution unit 104 performs the task of searching for a nonce that satisfies the predetermined rule (drawing task). When finding a nonce satisfying the determined rule, that is, succeeding in the drawing (Yes in step S205), the drawing execution unit 104 brings the drawing task to an end and proceeds to block transfer processing (step S206).

In step S206, the inter-verification node information sharing unit 102 performs processing of causing the block M12 having the nonce set therein to be shared within the verification node group 10. Note that the method of information sharing may be the same as step S202. When this processing sends, to the other verification nodes 1, the block M12 having the nonce set therein, the verification nodes that have received the block M12 proceeds to step S207.

In step S207, the information verification unit 105 performs the verification processing of verifying the block M12 thus received. Then, when the block M12 has been approved, it is determined that another node has succeeded in the drawing, and the drawing task is brought to an end (Yes in step S207). At this time, when the own node is the GW verification node 1', the node proceeds to processing of making a response to a request source (step S208).

In step S208, the external-oriented information sharing unit 101 transmits, to the information retrieval node 2, the block M12 subjected to the drawing by its own node or sent from another node and approved by its own node. This block M12 is a block in which the desired information and the information retrieval request are stored in the data section, and the nonce satisfying the determined rule is set.

Note that the drawing execution unit 104 repeatedly performs the drawing task until a nonce satisfying the determined rule is found or until any one of the other nodes succeeds in the drawing. More specifically, when the nonce thus set does not satisfy the rule, that is, the drawing fails (No in step S205), and none of the other nodes has succeeded in the drawing (No in step S207), the drawing execution unit 104 returns to step S204 and performs the drawing execution processing again.

Note that verification nodes 1 other than the GW verification node 1' start processing upon directly or indirectly receiving the information retrieval request M11 transferred through the information retrieval request sharing processing by the GW verification node 1'. As shown in FIG. 8, upon receiving the information retrieval request M11, the verification nodes 1 other than the GW verification node 1' perform the information retrieval request sharing processing (step S301) to the drawing execution processing (step S303). Note that these types of processing are the same as step S202 to step S204 described above. This causes the information retrieval request M11 to be shared among all the verification nodes 1, and each of the verification nodes 1 other than the GW verification node 1' generates the same block and performs the drawing task.

Herein, when any one of the verification nodes 1 other than the GW verification node 1' finds a nonce satisfying the determined rule during execution of the drawing execution processing (Yes in step S304), the verification node 1 brings the drawing task to an end and proceeds to the block transfer processing (step S305).

Further, when each of the verification nodes 1 other than the GW verification node 1' that has not succeeded in the drawing receives the block M12 from another verification node 1, the verification node 1 performs the verification processing of verifying the block M12 thus received, determines that, when the block M12 has been approved, the drawing has succeeded in another node, and then brings the drawing task to an end (Yes in step S306). As described above, each of the verification nodes 1 other than the GW verification node 1' repeatedly performs the drawing task until finding a nonce satisfying the determined rule or until another node succeeds in the drawing.

As described above, according to the present exemplary embodiment, reliability of retrieved information is evaluated by using the nature of the task of searching for a nonce that it is difficult to finish the task in a short time unless a large number of verification nodes 1 perform the task simultaneously. More specifically, the information retrieval node 2 determines whether the retrieved information has been approved by a large number of verification nodes 1 on the basis of a time taken from the transmission of the information retrieval request to the reception of the block having an appropriate nonce set therein after the execution of the drawing. Further, the configuration where the block to be transmitted as a response to the information retrieval request includes the verification information generated by the information retrieval node 2 makes it possible to confirm whether the drawing on the block is performed after the transmission of the information retrieval request by the information retrieval node 2. Such characteristics allows the information retrieval node 2 to evaluate the reliability of retrieved information without associating, in advance, information to be used in authentication with a counterpart device from which information is retrieved.

If some malicious verification nodes 1 are present in the verification node group 10 that manages the desired information, in order to send information altered by the malicious verification nodes 1 to the information retrieval node 2, it is required that only the malicious verification nodes 1 succeed in the drawing. The smaller a total computational capability of the malicious verification nodes 1 is, the longer a time taken until the reception of a response becomes, which making it possible, through reliability evaluation based on the time taken until the reception of a response, to prevent the reception of the information altered by the malicious verification nodes 1 as highly-reliable information.

Herein, there is a possibility that some malicious verification nodes 1 accidentally succeed in the drawing in a short time. In this case, according to the first exemplary embodiment described above, information approved only by the malicious verification nodes 1 may be sent to the information retrieval node 2.

Note that the first exemplary embodiment described above may be further enhanced as follows in consideration of the possibility that such a malicious verification node 1 is present. That is, the information retrieval node 2 repeatedly performs a series of processes of transmitting the information retrieval request and receiving the block as a response a predetermined number of times. Then, whether the information retrieval node 2 receives the same result each time, that is, receives the block within a predetermined time and a nearly constant response time may be added to determination criteria of whether it is highly-reliable information. This requires that, in order to cause the information retrieval node 2 to receive, as highly-reliable information, desired information altered by the malicious verification node 1, each drawing only by the malicious verification node 1 be finished in a short time. Therefore, the larger the number of repetitions is, the more determination accuracy can be increased. The number of repetitions can be determined on the basis of a type or degree of importance of information to be retrieved. That is, the more the information needs to be accurate, the larger the number of repetitions can be increased.

Modification of First Exemplary Embodiment

There are various modifications of the first exemplary embodiment other than the above. Herein, a description will be given of some of the modifications.

Modification 1

Each of the verification nodes 1 described in the first exemplary embodiment has many similarities in configuration and operation to a ledger management node of a distributed ledger system that manages a blockchain using the PoW, and such a ledger management node may serve as the verification node 1. In this configuration, each of the verification nodes 1 may apply the PoW to a block that is generated in response to the information retrieval request transmitted from the information retrieval node 2 and includes desired information and the like, and add the block to the blockchain. This configuration allows, when the block has been added to the blockchain, any one of the verification nodes 1 to send the block thus added to the information retrieval node 2 or notify the information retrieval node 2 that such a block has been added. The information retrieval node 2 may determine, on the basis of a time required for the block corresponding to a response block to the information retrieval request to be added to the blockchain managed by the distributed ledger system, whether the desired information included in the block is highly-reliable information.

Such a configuration allows a node (information retrieval node 2) not included in the distributed ledger system to retrieve some information in a ledger, without retrieving the whole of the ledger, while confirming that a large number of ledger management nodes (verification nodes 1) have given approval. The effects of the first exemplary embodiment can be restated in this way from the viewpoint of the distributed ledger system.

Furthermore, in a case where each of the verification nodes 1 is a ledger management node of the distributed ledger system that manages the blockchain using the PoW, the first exemplary embodiment may be modified as follows. That is, a configuration may be employed where the verification node 1 notifies the information retrieval node 2 that a block corresponding to a response block has been added in a predetermined time after the reception of the information retrieval request or sends all blocks including this block and subsequently added blocks to the information retrieval node 2. Such a configuration allows the information retrieval node 2 to determine whether the desired information included in the block corresponding to the response block is highly-reliable information on the basis of the number of blocks added to the blockchain after the block corresponding to the response block within the predetermined time, the blockchain being managed by the ledger management system to which the verification node participates.

In such a distributed ledger system that manages the blockchain using the PoW, a ledger management node is capable of verifying information or a block sent from the other ledger management nodes to determine whether to add the block to the blockchain. Accordingly, in a situation where there is only information approved by a large number of ledger management nodes, the frequency of addition of blocks to the blockchain becomes higher. In other words, for a blockchain including blocks approved only by a few ledger management nodes, only the few ledger management nodes add blocks, and the frequency of addition of blocks becomes lower. With such a characteristic, it can be expected that, in the blockchain managed by the distributed ledger system, as the number of blocks added after the block corresponding to the response block is added increases, the desired information included in the block corresponding to the response block has been approved by a large number of verification nodes.

Modification 2

According to a second modification, a reduction in amount of data included in the block makes the communication load lower. In the description of the first exemplary embodiment given so far, the block generation unit 103 stores the desired information in the data section of the block generated. It is possible to store a digest of the desired information in the block rather than storing the desired information itself in the block. Herein, a value that results from applying a one-way function such as a hash function to any given information is referred to as a digest. A digest of any given information λ is very unlikely to match a digest of information Y different from the information X, so that the digest can be used in verification of the information X. For example, a node having the information X can compare a digest $D_x$ of the information X owned by itself with a value $D_x'$ corresponding to the digest of the information X in the block to verify whether two pieces of information from which the digests are generated are identical to each other.

In such a case, instead of the above item (B1) and item (B3), the information verification unit 105 may compare a digest of the desired information included in the block with a digest generated in the same manner from the desired information stored in the information storage unit 106 that is a response to the information retrieval request to confirm whether the digests are identical to each other. In general, since such a digest has a smaller in data size than source information, such a configuration makes it possible to reduce the communication load at the time of sharing blocks among the verification nodes 1.

Note that, in this configuration, since the block does not include the desired information itself, the external-oriented information sharing unit 101 may further have a capability of transmitting, to the information retrieval node 2, the desired information itself together with the block. Further, in this configuration, during execution of the verification processing on the desired information, the information verification unit 203 of the information retrieval node 2 may further have a capability of adding processing of confirming whether the digest of the desired information included in the block thus transmitted matches the digest of the desired information transmitted together with the block.

Modification 3

One block may include sets of a plurality of information retrieval request and desired information. In this configuration, the information verification unit 105 of each of the verification nodes 1 may perform the determination based on the above item (B1) to item (B3) on all the information retrieval requests and pieces of desired information in the block. Further, the information verification unit 203 of the information retrieval node 2 may perform the determination based on the above item (A1) and item (B2) on all the information retrieval requests and pieces of desired information in the block.

Modification 4

In the above description, for the sake of simplicity, the GW verification node 1' that has received the information retrieval request from the information retrieval node 2 is responsible for transmitting the block to the information retrieval node 2, but in general, a verification node 1 (GW verification node 1') that receives the information retrieval request from the information retrieval node 2 and a verification node 1 that transmits the block to the information retrieval node 2 may be different from each other. For example, a verification node 1 that has succeeded in the drawing may directly transmit the block to the information retrieval node 2 on the basis of the contents of the information retrieval request in the block.

Modification 5

In the above description, all nodes hold the desired information in advance, but the present invention is not limited to this configuration. For example, at least one verification node 1 may hold the desired information, and the other verification nodes 1 may hold information (verifiable information) that can be used to verify the desired information. Examples of the verifiable information include the digest of the desired information, a condition the desired information should satisfy (such as a value range), and the like. In such a configuration, each of the verification nodes 1 may generate a block including the verifiable information rather than the desired information. Then, in the process of causing a block for which any one of the verification nodes 1 has succeeded in the drawing to be shared among the verification nodes 1, the verification node 1 holding the desired information may transmit, to the information retrieval node 2, the block together with the desired information. Note that, each of the verification nodes 1 may share not only the information retrieval request but also the block generated by the verification node 1 holding the desired information with the other verification nodes 1 during execution of the processing of causing the information retrieval request to be shared among the other verification nodes 1. In this configuration, the information retrieval request is transferred to the verification node 1 holding the desired information, and the block is generated by the verification node 1. Then, the block generated by the verification node 1 is transferred to the other verification nodes. The plurality of verification nodes 1 that have received the block including the desired information as described above may perform the drawing task simultaneously. In this configuration, the information verification unit 105 may confirm whether the desired information in the block is correct information on the basis of, instead of the above item (B 1), the information that is held by its own node and can be used to verify the desired information.

As another variation, a dedicated node (such as a storage on a cloud) holding the desired information may be prepared. In such a configuration, all the verification nodes 1 need not hold the desired information. Note that, in the present example, it is also assumed that all the verification nodes 1 hold information that can be used to verify the desired information. In the present example, for example, each of the verification nodes 1 may retrieve the desired information from the above dedicated node and generate a block during execution of the block generation processing by the block generation unit 103.

Modification 6

There are also various modifications of the rule for searching for a nonce. For example, the rule can be determined on the basis of the nature of the desired information. For example, the rule can be defined such that the larger the degree of influence when the desired information is altered is, the higher the difficulty of finding a nonce satisfying the rule by the drawing execution unit 104 becomes. As an example, when the drawing is performed on the basis of the rule that the hash value of the block is equal to or less than a target value, the higher the degree of influence when the desired information is altered is, the lower the target value can be set. At this time, the degree of influence when the desired information is altered can be set by the user, or alternatively can be determined on the basis of an owner of the desired information or an application that uses the desired information.

Modification 7

Furthermore, the rule for searching for a nonce may be determined on the basis of the verification information. For example, the verification information included in the information retrieval request may include information on the rule. In this manner, the rule serving as a criterion for determination of whether an appropriate nonce is set by the drawing execution unit 104 is determined on the basis of the verification information. In this configuration, the drawing execution unit 104 may check the nonce thus set on the basis of the rule represented by the verification information included in the information retrieval request stored in the information storage unit 106. Further, the information verification unit 105 may verify the block transmitted from another verification node on the basis of the rule represented by the verification information included in the information retrieval request stored in the information storage unit 106. Similarly, the information verification unit 203 may verify the desired information included in the block retrieved from any one of the verification nodes 1 on the basis of the rule represented by the verification information stored in the information storage unit 204.

As a specific example, the verification information may include information on an upper limit and lower limit of the hash value of the block.

Second Exemplary Embodiment

Next, a description will be given of a second exemplary embodiment of the present invention. In the second exemplary embodiment, a description will be given of a method, in a configuration where a plurality of the information retrieval nodes 2 are present, of causing each of the information retrieval nodes 2 to confirm whether the information retrieved from any one of the verification nodes 1 is highly-reliable information. Note that no description will be given as needed of the same configuration and operation as the configuration and operation according to the first exemplary embodiment.

The present exemplary embodiment is effective particularly in a case where the plurality of information retrieval nodes 2 are present, and communication resources between the information retrieval nodes 2 and the verification nodes 1 are limited as compared with communication resources between the information retrieval nodes 2. For example, when a communication band of a network over which the verification nodes 1 and the information retrieval nodes 2 are connected with each other is narrow, it is undesirable from the viewpoint of communication load that all the information retrieval nodes 2 individually attempt to retrieve information from the verification nodes 1 by the method described in the first exemplary embodiment. Therefore, according to the present exemplary embodiment, some of the information retrieval nodes retrieve information from the verification nodes, and then share the information with the other information retrieval nodes.

However, a method of simply transferring information retrieved by any one of the information retrieval nodes from any one of the verification nodes to the other information retrieval nodes to cause the information to be shared among the information retrieval nodes has the following problems. That is, when the information retrieval node that has retrieved the desired information is a malicious node, the other information retrieval nodes cannot determine whether the desired information has been approved by a large number of verification nodes 1.

For example, when the information retrieval node that retrieves information directly from any one of the verification nodes and some of the verification nodes collude with each other, it is possible to send, to the other information retrieval nodes, altered information as highly-reliable information. As a specific example, a malicious information retrieval node sends an information retrieval request generated by itself to a verification node colluding with the malicious information retrieval node. The verification node shares the information retrieval request with a group consisting of verification nodes colluding with the verification node to cause each of the verification node in the group to perform the drawing. This drawing is performed only by some verification nodes colluding with each other, and thus generally takes a long time to succeed. However, information retrieval nodes other than the information retrieval node that has transmitted the information retrieval request cannot determine that it has taken a long time for the drawing to succeed only on the basis of a response block transferred from the information retrieval node that has transmitted the information retrieval request. Accordingly, when some malicious verification nodes and malicious information retrieval nodes collude with each other, it is possible even for altered information approved only by the malicious verification nodes to be sent to the other information retrieval nodes 2 as highly-reliable information.

Therefore, according to the present exemplary embodiment, a mechanism is employed that allows, even when a malicious information retrieval node colluding with a malicious verification node retrieves desired information, the other information retrieval nodes to verify the desired information. That is, according to the present exemplary embodiment, provided is a means of determining whether the desired information thus retrieved is highly-reliable information even by an information retrieval node 2 that has not retrieved the desired information directly from the verification node.

Figure 9:
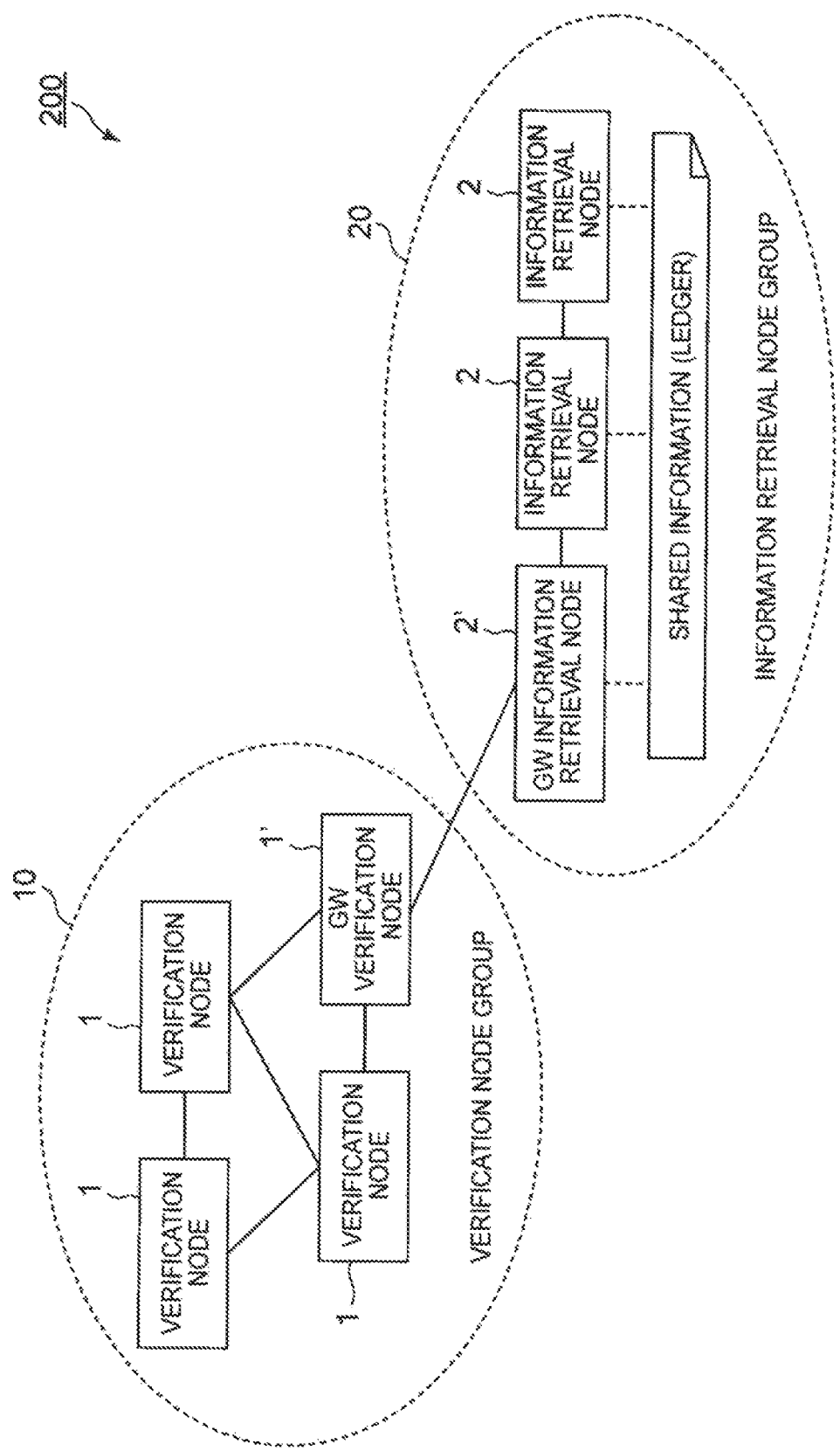
FIG. 9 is an explanatory diagram schematically showing a configuration of an information verification system of a second exemplary embodiment.

FIG. 9 is an explanatory diagram schematically showing a configuration of an information verification system of the second exemplary embodiment. An information verification system 200 shown in FIG. 9 includes a verification node group 10 and an information retrieval node group 20. The verification node group 10 includes a plurality of verification nodes 1. Further, the information retrieval node group 20 includes a plurality of information retrieval nodes 2. Herein, the information retrieval node group 20 is a group of nodes that desire information managed by the verification node group 10. Note that the verification node group 10 and the verification nodes 1 are the same as in the first exemplary embodiment.

In such a configuration, one of the information retrieval nodes 2 (GW information retrieval node 2' in the drawing) of the information retrieval node group 20 retrieves desired information directly from any one of the verification nodes 1, and shares the desired information thus retrieved with the other information retrieval nodes 2. Hereinafter, the information retrieval node 2 responsible for transmitting the information retrieval request to any one of the verification nodes 1 may be referred to as a gateway (GW) information retrieval node 2'.

According to the present exemplary embodiment, each of the information retrieval nodes 2 holds information that is shared among all the information retrieval nodes 2 and from which a time when the information is recorded can be estimated. In order to hold such information, each of the information retrieval nodes 2 serves as a part of a distributed ledger system. That is, each of the information retrieval nodes 2 is capable of accessing information in a ledger shared within the distributed ledger system. Further, the distributed ledger system constituted by the information retrieval node group 20 is capable of estimating a time when information is recorded in the ledger.

For example, with a distributed ledger system in which a blockchain is managed and shared using the PoW, it is possible to estimate a time when a block and information in the block are recorded on the basis of an average time when the drawing using the PoW succeeds. Each of the information retrieval nodes 2 may be a ledger management node in such a distributed ledger system, or may be a node capable of only sharing and accessing the ledger. Further, although not shown in FIG. 9, a node other than the information retrieval nodes 2 may be present as a ledger management node.

Figure 10:
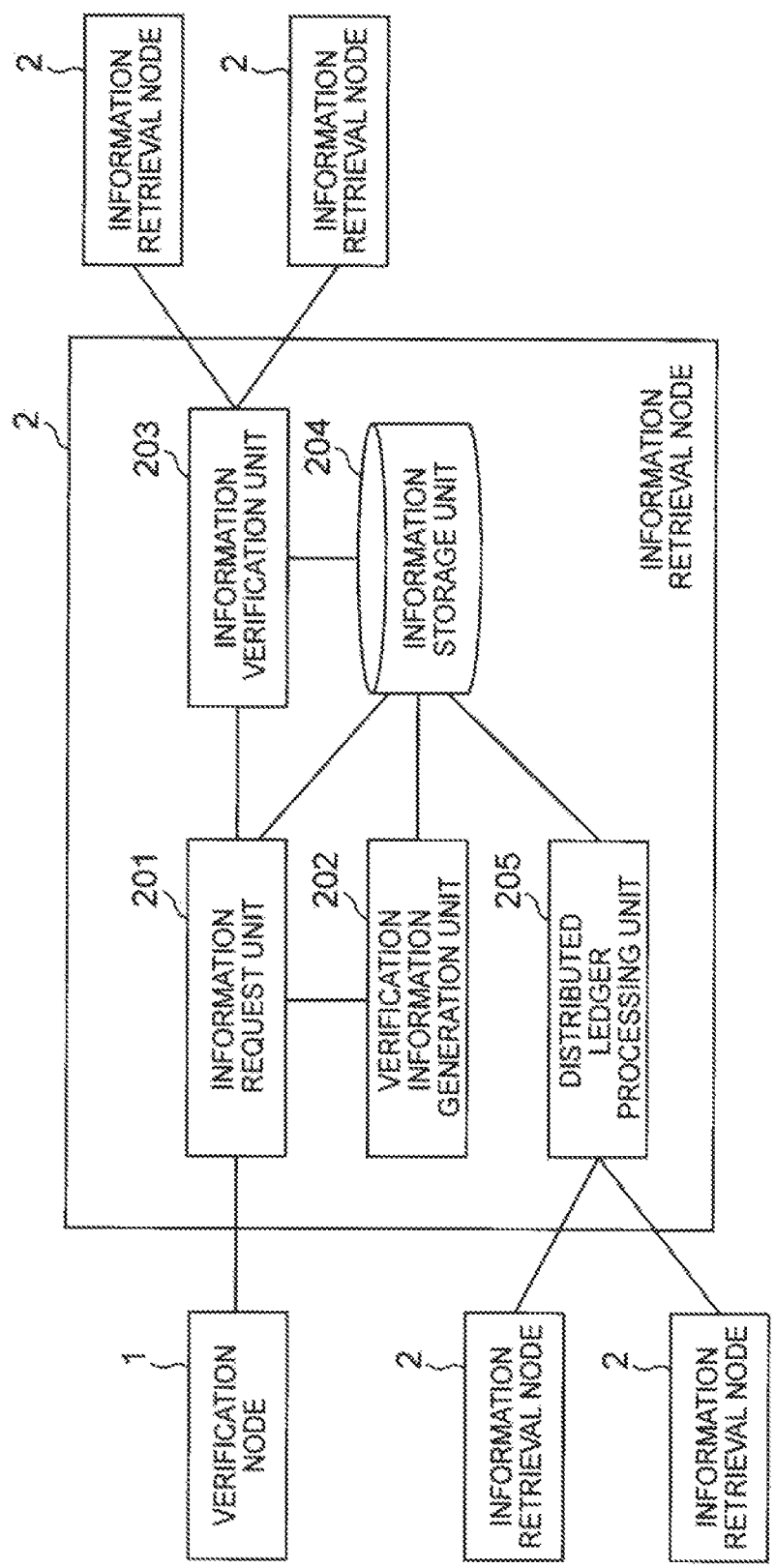
FIG. 10 is a block diagram showing an exemplary configuration of an information retrieval node 2 of the second exemplary embodiment.

FIG. 10 is a block diagram showing an exemplary configuration of the information retrieval node 2 of the second exemplary embodiment. As shown in FIG. 10, the information retrieval node 2 may include an information request unit 201, a verification information generation unit 202, an information verification unit 203, an information storage unit 204, and a distributed ledger processing unit 205. Hereinafter, a description will be given mainly of parts different from the first exemplary embodiment.

The information request unit 201 is substantially the same as in the first exemplary embodiment. However, unlike the first exemplary embodiment, when transmitting the information retrieval request, the processing of storing the transmission time information in the information storage unit 204 is omitted.

As in the first exemplary embodiment, the verification information generation unit 202 generates verification information to be included in the information retrieval request. The verification information generation unit 202 of the present exemplary embodiment generates the verification information on the basis of information in the ledger managed by the distributed ledger system (hereinafter, referred to as a distributed ledger). Although the details will be described later, it is assumed that the information in the distributed ledger is stored in the information storage unit 204 of each of the information retrieval nodes 2, or is shared with the other information retrieval nodes 2 and stored in a predetermined storage device that can be freely accessed. Hereinafter, to be more specific, the distributed ledger corresponds to a storage unit (such as the information storage unit 204 or the predetermined storage device described above) that actually holds the information managed by such a distributed ledger system.

The verification information generation unit 202 generates the verification information on the basis of the information that is recorded in the distributed ledger and shared among all the information retrieval nodes 2, and from which a time can be estimated, and sends the verification information to the information request unit 201. As an example, the verification information generation unit 202 can generate, as the verification information, a digest of a block that is predetermined N1 blocks back from the latest block of the blockchain managed by the distributed ledger system. Note that, with N1 set to 0, a digest of the latest block may be used as the verification information.

The verification information may be based on the information recorded in the distributed ledger, and is not limited to the example described above. For example, rather than making N1 corresponding to blocks back from the latest block constant, N1 may be determined each time the information retrieval request is transmitted. In such a configuration, a pair of a digest of the block that is N1 blocks back from the latest block and N1 is used as the verification information. Further, a result of computing a digest of a combination of a plurality of blocks may be used as the verification information. Note that, unlike the first exemplary embodiment, the verification information generation unit 202 need not necessarily store the verification information generated in the information storage unit 204.

When not only its own node receives the response block, but also another information retrieval node 2 transfers the response block to its own node, the information verification unit 203 verifies the desired information in the block. At this time, the information verification unit 203 verifies the desired information on the basis of the information in the distributed ledger. More specifically, the information verification unit 203 according to the second exemplary embodiment verifies the response block on the basis of the following determination conditions.

(C1) The block includes the desired information specified by the information retrieval request;
(C2) The block satisfies a predetermined rule defined for common use between the verification node group 10 and the information retrieval node group 20; and
(C3) The verification information included in the block is information generated on the basis of information newer than a predetermined reference in the distributed ledger.

The information verification unit 203 may confirm each of the above items (C1) to (C3) and determine that the desired information received is highly-reliable information when all the items are satisfied. Herein, since the item (C1) and the item (C2) are the same as the item (A1) and the item (A3) of the first exemplary embodiment, respectively, a description will be given only of the item (C3).

According to the present exemplary embodiment, each of the information retrieval nodes 2 is capable of accessing the information in the distributed ledger. Further, the information recorded in the ledger is information from which a time when the information is recorded can be estimated. This allows each of the information retrieval nodes 2 to determine whether the verification information is generated from information newer than the predetermined reference in the distributed ledger.

Hereinafter, a description will be given of a more concrete determination method for the item (C3) that is applied to a case where the distributed ledger system is a system that additionally manages a blockchain, and each of the information retrieval nodes 2 serves as a ledger management node. The condition described as the item (C3) "the verification information included in the block is information generated on the basis of information newer than a predetermined reference in a distributed ledger" can be read as, for the ledger management node in the distributed ledger system that manages the blockchain, "the verification information included in the block is information generated on the basis of a block that is within N3 blocks from the latest block of the blockchain held by the information storage unit 204". Note that even in a case where each of the information retrieval nodes does not serve as the ledger management node, it is sufficient that each of the information retrieval nodes can access the blockchain, and where the blockchain is stored is not limited to the information storage unit 204.

Figure 11:
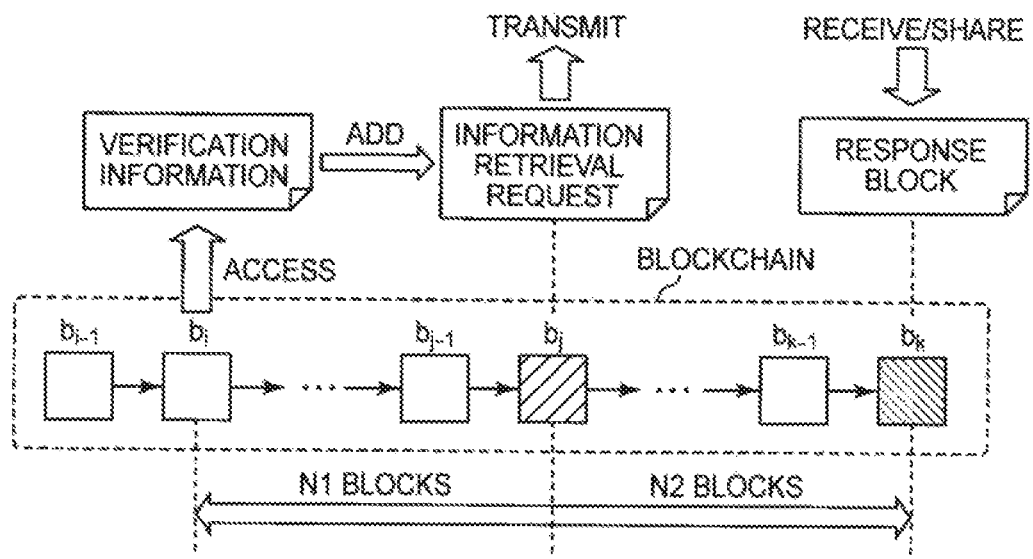
FIG. 11 is an explanatory diagram showing a relation between a blockchain managed by an information retrieval node group 20 and verification information.

FIG. 11 is an explanatory diagram showing a relation between the blockchain managed by the information retrieval node group 20 and the verification information. A relation between the blockchain managed by the distributed ledger system in which the information retrieval node group 20 is included and the verification information at each time point is as shown in FIG. 11. In the example shown in FIG. 11, the GW information retrieval node 2' generates verification information including a digest of a block that is N1 blocks back (a block $b_i$ in the drawing) from the latest block (a block $b_j$ in the drawing) at a time of transmitting an information retrieval request and set the verification information in the information retrieval request. Herein, it is assumed that several blocks (N2 in the drawing) have been added to the blockchain in a time from transmission of the information retrieval request until verification on desired information by the information verification unit 203 of any one of the information retrieval nodes 2. In this case, when verifying the desired information, the information verification unit 203 of the information retrieval node 2 searches for a block whose digest matches the verification information included in a response block (the block $b_i$ in the drawing) from the latest block (a block $b_k$ in the drawing) of the blockchain at that time and counts blocks added within the time (N1+N2). This makes it possible to estimate an approximate time taken from the transmission of the information retrieval request until the reception of the response block by the information retrieval node 2. Note that N2 that results from subtracting N1 from the number of additional blocks (N1+N2) denotes the number of blocks added to the blockchain in the time from the transmission of the information retrieval request to the reception of the response block (hereinafter, referred to as the actual number of additional blocks).

The information verification unit 203 takes a value that results from multiplying the number of additional blocks by an average block addition time T for the blockchain as an approximate time taken from the transmission of the information retrieval request to the reception of the desired information and determines the reliability of the desired information.

Therefore, defining the upper limit N3 of the number of additional blocks corresponding to the predetermined time in the above item (A4) makes it possible to confirm that the reception of the response block corresponds to the information retrieval request signal transmitted at a time when the block identified by the verification information is the latest block and that the reception of the response block has been made within the predetermined time from the transmission of the information retrieval request. Therefore, as a concrete example of the determination method of the above item (C3), the information verification unit 203 may confirm whether a block whose digest matches the verification information is within predetermined N3 blocks from the latest block at a time when verification is performed on the desired information. When the block is within N3, it can be estimated that a time from the transmission of the information retrieval request by the GW information retrieval node 2' to the reception of the desired information by the own node is within (N3−N1)*T. Accordingly, the determination as described in the first exemplary embodiment "a larger number of verification nodes have given approval because the drawing has succeeded within a predetermined time" is also possible in the second exemplary embodiment. N3 can be determined on the basis of N1 and T.

Note that in a case where the average block addition time T of the information retrieval node group 20 is overwhelmingly long compared with the average time taken for the drawing to succeed in the verification node group 10, N2 may be always 0. Setting the rule in accordance with the number of nodes in each group (in some cases, dynamically changing the rule) makes it possible to avoid such a case. Note that, according to the present exemplary embodiment, it is assumed that the rule is appropriately set on the basis of the number of ledger management nodes of the distributed ledger system in which the information retrieval nodes are included (or total computational complexity) and the average time taken for the drawing to succeed in the verification node group. An example of the setting method will be given below. For example, a target value $T_1^{obj}$ of the average time taken for the drawing to succeed in the verification node group and a target value $T_2^{obj}$ of the average time taken for the drawing to succeed in the ledger management node group of the distributed ledger system in which the information retrieval nodes are included are defined. At this time, in order to prevent the average block addition time T of the information retrieval node group 20 from becoming overwhelmingly long compared with the average time taken for the drawing to succeed in the verification node group 10, a constant K is defined to satisfy $T_2^{obj}<K*T_1^{obj}$. Then, an adjustment is made, for example, when a measured value of the average time taken for the drawing to succeed in the verification node group exceeds $T_1^{obj}$, the rule applied to the verification node group is relaxed, and when a measured value of the average time taken for the drawing to succeed in the ledger management node group exceeds $T_2^{obj}$, the rule applied to the ledger management node group is relaxed. This makes it possible to avoid the above case.

Furthermore, the information verification unit 203 of the present exemplary embodiment can transfer desired information and a block retrieved by itself to the other information retrieval nodes 2. The information verification unit 203 can cause information to be shared among the information retrieval nodes by, for example, the same method as the method of causing information to be shared among verification nodes of the first exemplary embodiment. In addition to the above method, for example, it is possible to cause information to be shared among all the nodes participating in the blockchain in accordance with a blockchain sharing algorithm of the distributed ledger system. For example, the information verification unit 203 of the information retrieval node 2 that has received a block from any one of the verification nodes 1 declares addition of the block to the blockchain, thereby allowing the information retrieval node 2 to share information with the other information retrieval node 2 through the PoW. Upon receiving a block to be added, the information verification unit 203 of each of the information retrieval nodes 2 may verify the desired information in the block by the above-described method together with or separately from the verification using the PoW in the distributed ledger system. At this time, the information verification unit 203 may start the search not from the latest block at the time of verification but from the block including the desired information to obtain N3. Note that the verification using the PoW in the distributed ledger system is performed by the distributed ledger processing unit 205 to be described later.

The information storage unit 204 holds, for example, information in the distributed ledger recorded by the distributed ledger unit. As described above, the information in the distributed ledger is accessed when the verification information generation unit 202 generates the verification information and when the information verification unit 203 verifies the desired information. Note that when its own node does not hold the information in the distributed ledger, the information storage unit 204 may be omitted.

The distributed ledger processing unit 205 provides a capability of causing its own node to serve as a part of the distributed ledger system. That is, the distributed ledger processing unit 205 has a capability of retrieving at least a ledger managed by the distributed ledger system from another node. Herein, another node may include another node of the distributed ledger system (including another information retrieval node 2), and any node constituting another distributed ledger system. Further, the distributed ledger processing unit 205 may have a capability of transferring the ledger thus retrieved to another node. Furthermore, the distributed ledger processing unit 205 may be capable of serving as a ledger management node of the distributed ledger system.

Herein, a description will be given in more detail of a distributed ledger system capability of the information retrieval node 2 of the present exemplary embodiment. The information retrieval node 2 preferably has the following capabilities as a ledger management node of the distributed ledger system:

1) Capable of verifying whether the verification information generated on the basis of the distributed ledger is correct; and
2) Capable of associating information used to verify whether the verification information in the above 1) is correct with a time (which may be either an absolute time or a relative time)

Note that, when the distributed ledger system is configured to manage a ledger using a blockchain, the information retrieval node 2 as a ledger management node typically has the following characteristics:

a) All ledger management nodes hold the same information (ledger);
b) Information to be held is a set of data structures called a block;
c) Each block has a hash value of at least one other block;
d) A directed acyclic graph is formed in which blocks serves as vertices, and each of the blocks has a directed edge toward another block having a hash value of the block;
e) Each block has a section called a nonce to be set through a drawing task using the nature of a one-way function; and
f) Blocks are sequentially added with time.

Note that the hash value in the above c) and d) may be a value equivalent to a hash value obtained by applying the one-way function.

The characteristic of the above a) allows each node to generate the same verification information, thereby satisfying the condition of the above 1). Further, the characteristic of the above f) allows a relative time to be computed from the number of blocks because blocks are added with time, thereby satisfying the condition of the above 2).

According to the present exemplary embodiment, the distributed ledger processing unit 205 is implemented with, for example, an information processing device that operates in accordance with a program, such as a CPU included in a computer operating as the information retrieval node 2.

Figure 12:
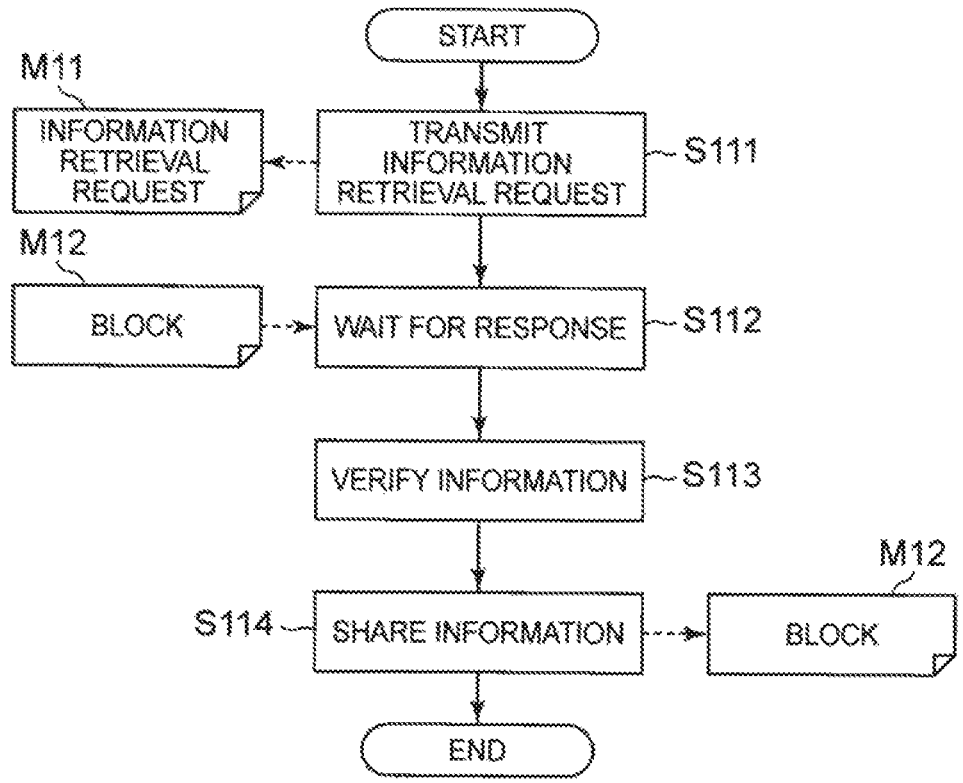
FIG. 12 is a flowchart showing an example of an operation of a GW information retrieval node 2' of the second exemplary embodiment.
Figure 13:
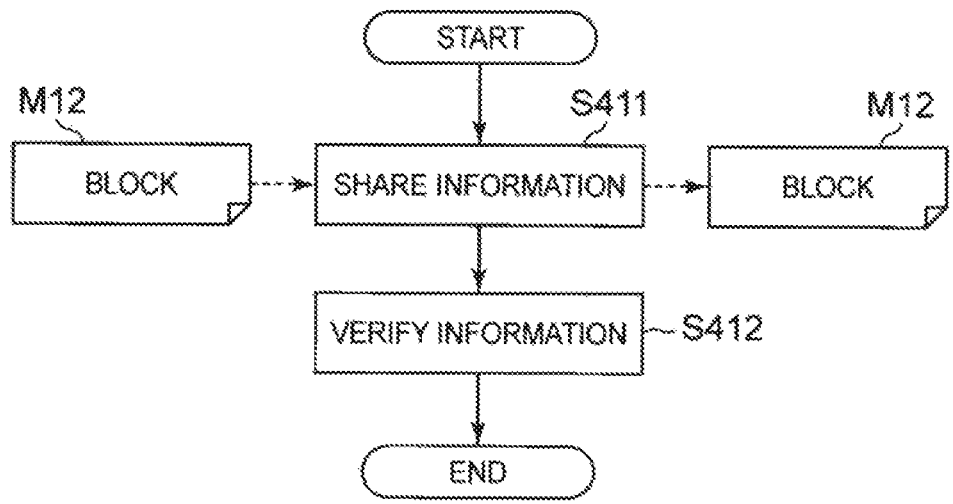
FIG. 13 is a flowchart showing an example of an operation of another information retrieval node 2 of the second exemplary embodiment.

Next, a description will be given of an operation according to the present exemplary embodiment. FIG. 12 is a flowchart showing an example of an operation of the GW information retrieval node 2'. FIG. 13 is a flowchart showing an example of an operation of an information retrieval node 2 other than the GW information retrieval node 2'. Note that the operation of the verification node 1 is the same as in the first exemplary embodiment, and thus no description will be given of the operation.

First, a description will be given of the operation of the GW information retrieval node 2' with reference to FIG. 12. Steps S111 to S113 in FIG. 12 are basically the same as steps S101 to S103 of the first exemplary embodiment. That is, the operation of the GW information retrieval node 2' is largely different from the operation of the information retrieval node 2 of the first exemplary embodiment in that the information sharing processing in step S114 is added. Note that other points will be described as needed in the description of the operation in each step.

In the present example, the GW information retrieval node 2' first performs information retrieval request transmission processing (step S111). During execution of this processing, the verification information generation unit 202 of the GW information retrieval node 2' first generates verification information on the basis of information in the distributed ledger. Next, the information request unit 201 of the GW information retrieval node 2' generates an information retrieval request M11 including the verification information thus generated and information that can identify desired information, and transmits the information retrieval request M11 to any one of the verification nodes 1 included in the verification node group 10. This processing differs from the information retrieval request transmission processing (step S101) of the first exemplary embodiment in that the verification information is generated on the basis of the information in the distributed ledger, and no transmission time information is stored.

Thereafter, the GW information retrieval node 2' performs wait-for-response processing (step S112). This processing is the same as the wait-for-response processing (step S102) of the first exemplary embodiment.

Upon receiving, from any one of the verification nodes 1 included in the verification node group 10, a block M12 that is a response to the information retrieval request transmitted in step S101, the information verification unit 203 of the GW information retrieval node 2' performs verification processing on the desired information (step S113). During execution of this processing, the information verification unit 203 verifies the desired information included in the block thus received on the basis of the information in the distributed ledger. Note that the details of the verification method are as described above, but differ from the verification processing on the desired information (step S103) of the first exemplary embodiment in that verification is performed on the basis of the information in the distributed ledger.

Finally, the GW information retrieval node 2' performs information sharing processing (step S114). During execution of this processing, the information verification unit 203 or the distributed ledger processing unit 205 transfers the block received from the verification node 1 to another information retrieval node 2. Note that the GW information retrieval node 2' need not perform the information sharing processing when it is determined that the desired information is not highly-reliable information as a result of the verification processing on the desired information (step S113).

Next, a description will be given of an operation of another information retrieval node 2 with reference to FIG. 13. As shown in FIG. 13, each of the information retrieval nodes 2 other than the GW information retrieval node 2' of the present exemplary embodiment performs, upon receiving the block M12 (response block) including the desired information from the GW information retrieval node 2' or another information retrieval node 2, information sharing processing (step S411). This processing may be the same as the information sharing processing (step S114) by the GW information retrieval node 2' shown in FIG. 12.

Thereafter, the information retrieval node 2 performs verification processing on the desired information (step S412). This processing may be the same as the verification processing on the desired information by the GW information retrieval node 2' (step S113) shown in FIG. 12.

Note that although not shown in FIG. 12 and FIG. 13, each of the information retrieval nodes 2 (including the GW information retrieval node 2') operates as a part of the distributed ledger system separately from the above operations.

As described above, according to the present exemplary embodiment, even when a single information retrieval node 2 retrieves the desired information from any one of the verification nodes 1 and shares the desired information with the other information retrieval nodes 2, it is possible for all the information retrieval nodes 2 to evaluate the reliability of the desired information without associating information to be used in authentication in advance with the other information retrieval nodes 2. Even if the GW information retrieval node 2' is a malicious node, the other information retrieval nodes 2 can evaluate the reliability of the desired information, which makes it difficult to alter the desired information so as to prevent the alteration from being detected.

Further, as shown as a modification of the first exemplary embodiment, each of the verification nodes 1 can also operate as a ledger management node of the distributed ledger system. In this configuration, the information verification method of the present exemplary embodiment is applicable to data communication between two distributed ledger systems that operate on a stand-alone basis. That is, when a ledger management node of a second distributed ledger system retrieves information in a first distributed ledger system, the ledger management node of the second distributed ledger system can verify whether the information thus retrieved is information approved by a large number of ledger management nodes of the first distributed ledger system, that is, whether the information is highly-reliable information without requiring the exchange of authentication information with another node and an increase in communication load between the distributed ledger systems.

Note that there are also various modifications of the second exemplary embodiment. Some of the modifications will be given below.

Modification 1

In the second exemplary embodiment, a description has been given that, as the verification information, hash values of some blocks of a blockchain managed by the distributed ledger system can be used. The verification information is not limited to such a hash value. In order for the information retrieval nodes 2 other than the GW information retrieval node 2' to verify the desired information on the basis of the block transmitted from any one of the verification nodes 1, it is only required that the verification information can be accessed by all the information retrieval nodes 2 and can be associated with a time. For example, information recorded in the blockchain can be used as the verification information.

As an example, the verification information may be a random number generated by a node responsible for transmitting the information retrieval request, as in the first exemplary embodiment. In such a configuration, the information retrieval node 2 responsible for transmitting the information retrieval request shares the verification information thus generated using the distributed ledger system. For example, the information retrieval node 2 adds a block in which the verification information is recorded to a blockchain managed by the distributed ledger system in which its own node is included and then transmits the information retrieval request. Note that, in the present example, the information retrieval node 2 that has generated the verification information may transmits the information retrieval request, or alternatively, an information retrieval node 2 uniquely defined as the GW information retrieval node 2' may transmit the information retrieval request in response to the addition of the block in which the verification information is recorded to the blockchain.

The nature of the blockchain allows information recorded in the blockchain to be shared among all the ledger management nodes (information retrieval nodes 2) and makes alteration of the information difficult. The use of the nature allows all the ledger management nodes to perform verification on the desired information of whether the desired information is highly-reliable information on the basis of the number of blocks added in a time from the record of the block including the verification information in the blockchain until the reception of a response block.

Note that, in order to ensure that the information retrieval request including the verification information (such as a random number) is transmitted after being recorded in the blockchain, information obtained after the PoW (a nonce value of the corresponding block) is further added to the verification information.

Modification 2

In the second exemplary embodiment, a description has been given that each of the information retrieval nodes 2 is capable of serving as a part of the distributed ledger system that manages a blockchain. Herein, the consensus algorithm applied to the distributed ledger system is not limited to the PoW. For example, the distributed ledger system in which the information retrieval nodes 2 are included may be a system using another consensus algorithm such as the practical *byzantine* fault tolerance (PBFT).

Figure 14:
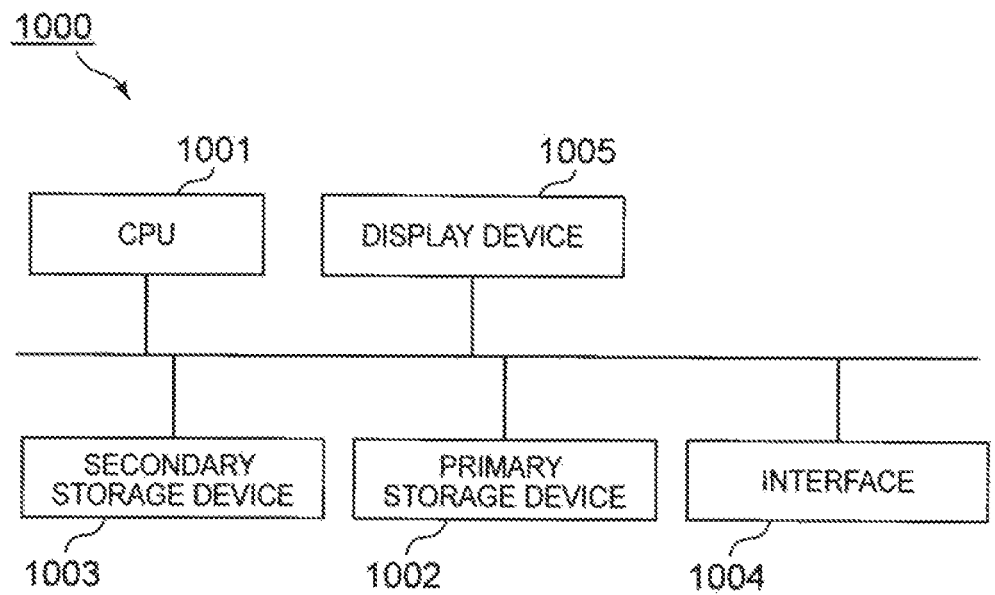
FIG. 14 is a schematic block diagram showing an exemplary configuration of a computer according to each exemplary embodiment of the present invention.

Next, a description will be given of an exemplary configuration of a computer according to each of the exemplary embodiments of the present invention. FIG. 14 is a schematic block diagram showing an exemplary configuration of the computer according to each of the exemplary embodiments of the present invention. A computer 1000 includes a CPU 1001, a primary storage device 1002, a secondary storage device 1003, an interface 1004, and a display device 1005.

Each node of the information verification system of each of the exemplary embodiments described above may be included in the computer 1000. In such a configuration, the operation of each node may be stored in the secondary storage device 1003 in the form of a program. The CPU 1001 reads the program from the secondary storage device 1003, loads the program onto the primary storage device 1002, and executes, in accordance with the program, predetermined processing according to each of the exemplary embodiments.

The secondary storage device 1003 is an example of a non-transitory tangible medium. Other examples of such a non-transitory tangible medium include a magnetic disk, a magneto-optical disk, a CD-ROM, a DVD-ROM, a semiconductor memory, and the like connected via the interface 1004. Further, when this program is delivered to the computer 1000 over a communication line, the computer 1000 that has received the program may load the program onto the primary storage device 1002 and execute the predetermined processing according to each of the exemplary embodiments.

Further, the program may be used for implementing part of the predetermined processing according to each of the exemplary embodiments. Furthermore, the program may be a differential program that implements the predetermined processing according to each of the exemplary embodiments in combination with another program already stored in the secondary storage device 1003.

Further, depending on processing contents according to each of the exemplary embodiments, some elements of the computer 1000 may be omitted. For example, a configuration where none of the nodes present information to the user makes it possible to omit the display device 1005. Although not shown in FIG. 14, depending on the processing contents according to each of the exemplary embodiments, the computer 1000 may include an input device. For example, the computer 1000 may include an input device for inputting an information retrieval instruction and attribute information on desired information.

Further, some or all of the components of each device are implemented with general-purpose or dedicated circuitry, a processor, and the like, or a combination thereof. These components may be constituted by a single chip or by a plurality of chips connected via a bus. Further, some or all of the components of each device may be implemented with a combination of the above-described circuitry and the like, and the program.

In a case where some or all of the components of each device are implemented with a plurality of information processing devices, or circuitry and the like, the plurality of information processing devices, or the circuitry and the like may be arranged in a concentrated manner or in a distributed manner. For example, the information processing devices, or the circuitry and the like may be implemented in a form such as a client and server system or a cloud computing system in which nodes are connected over a communication network.

Figure 15:
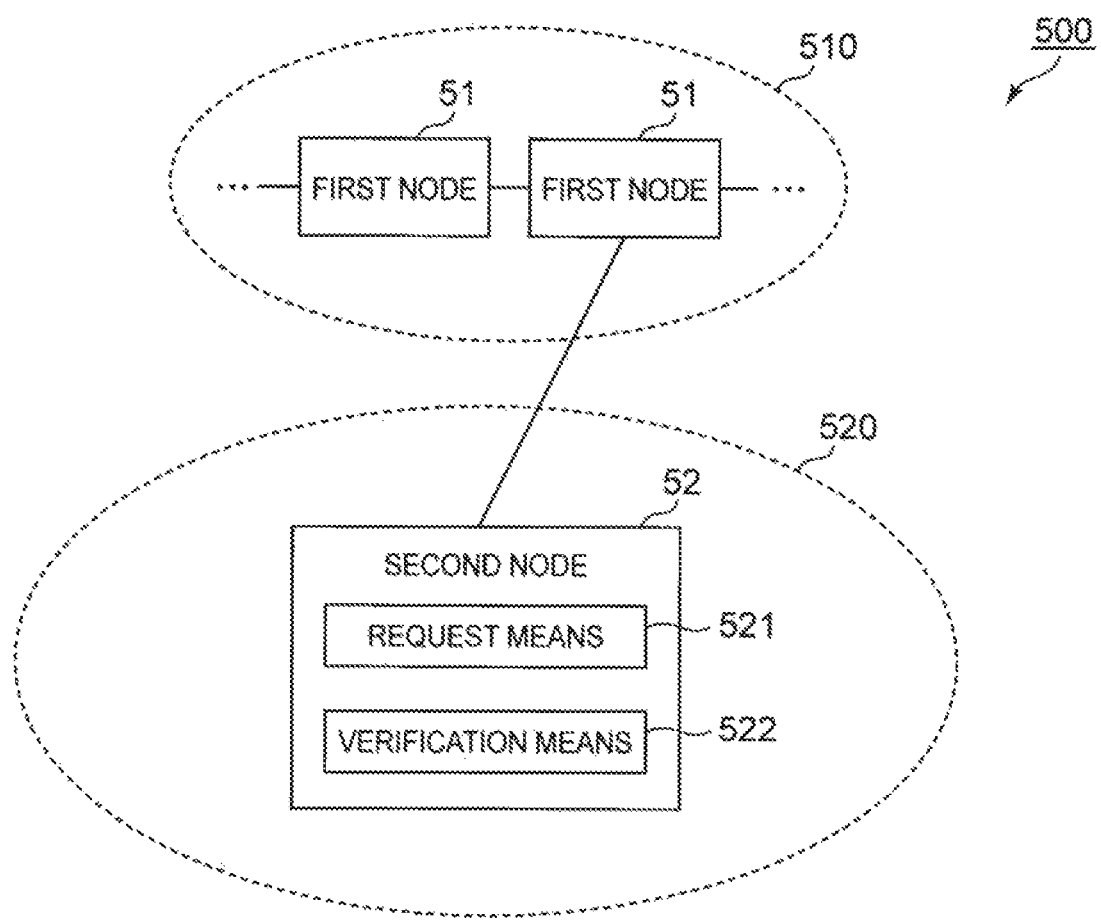
FIG. 15 is a block diagram schematically showing an information verification system of the present invention.

Next, a description will be given of an outline of the present invention. FIG. 15 is a block diagram schematically showing an information verification system of the present invention. An information verification system 500 shown in FIG. 15 includes a first node group 510 including a plurality of nodes 51 and a second node group 520 including at least one node 52. Further, the at least one node 52 includes a request means 521 and a verification means 522.

The request means 521 (for example, the information request unit 201) transmits, to at least any node 51 of the first node group 510, a request signal for requesting information, the request signal including verification information that is information for use in verification to be generated each time the request signal is transmitted.

The verification means 522 (for example, the information verification unit 203) verifies response information that is information transmitted from any one of the nodes 51 included in the first node group 510 in response to the request signal. At this time, the verification means 522 determines, regarding the response information, whether or not desired information that is information requested by the request signal or a digest thereof is included, whether or not correct verification information is included, whether or not a value obtained by applying a one-way function to the response information satisfies a predetermined rule defined for common use between the first node group 510 and the second node group 520, and a response time that is a time taken between the transmission of the request signal and the obtainment of the desired information, and on the basis of the determination results thereof, assessing the presence or absence of reliability of the desired information or the degree of reliability thereof.

Such a configuration makes it possible to evaluate the reliability of the desired information with no particular authentication of a node that has transmitted the response information.

Herein, the determination of the response time is not limited to a determination based on a measured value of the response time, but includes, for example, a determination based on a response time that is associated with the verification information and estimated on the basis of information from which the response time can be estimated. Further, when the response information is transmitted after a lapse of a predetermined time, the response time can be determined on the basis of volume of information processed by a predetermined method in any one of the nodes included in the first node group within a time after the desired information has been approved by the node. In this case, more specifically, it can be said that the determination is based on the response time and the increase in shared information in the first node group in the time, but in a broad sense, it can be said that the determination is based on the response time.

Figure 16:
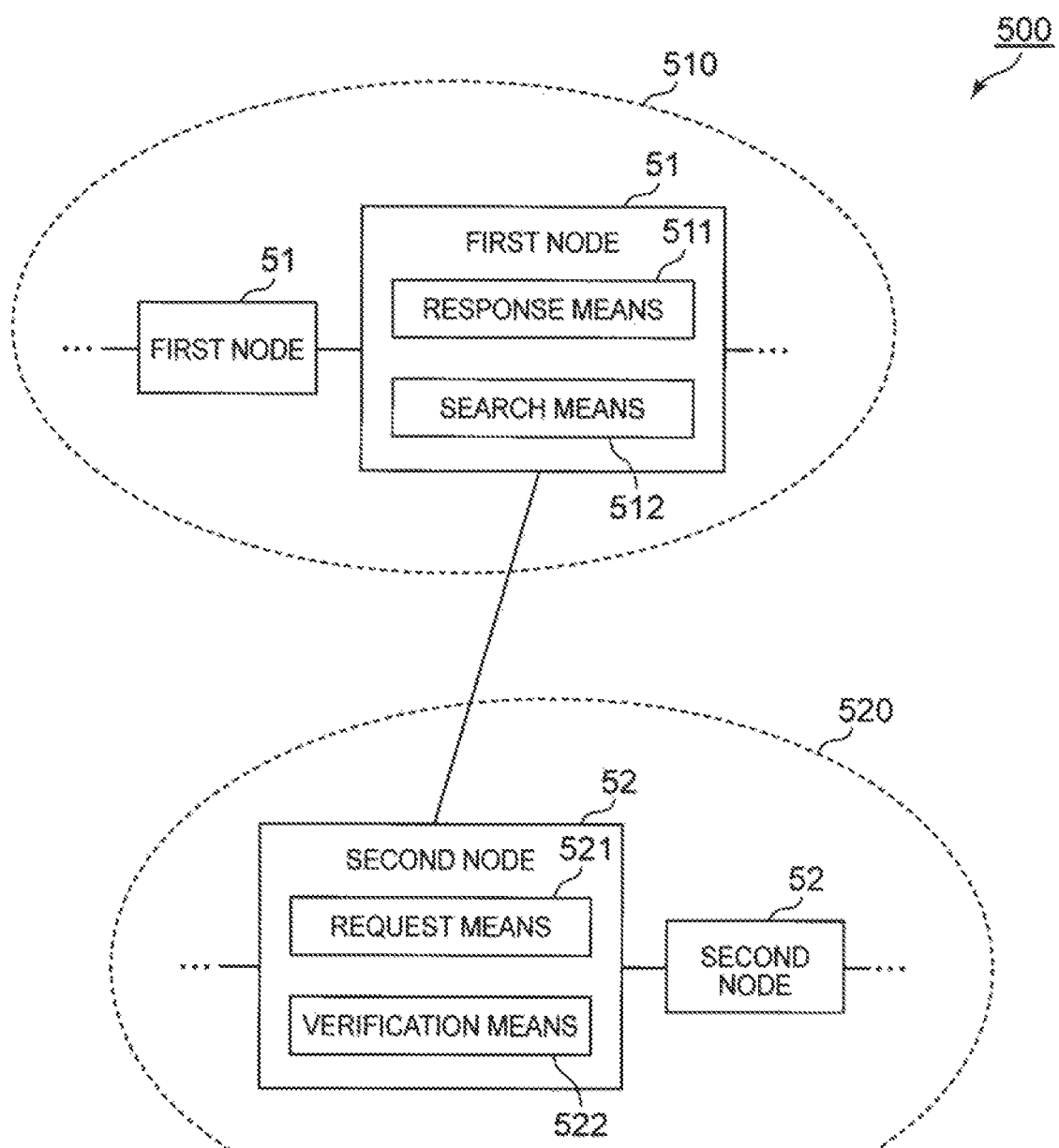
FIG. 16 is a block diagram showing another example of the information verification system of the present invention.

Further, FIG. 16 is a block diagram showing another example of the information verification system of the present invention. As shown in FIG. 16, in the information verification system 500, the second node group 520 may include a plurality of nodes 52, which allows each of the nodes 52 to be implemented as a ledger management node in a distributed ledger system or as a node capable of accessing a distributed ledger managed by the ledger management node. Note that although an example where one node 52 includes the request means 521 and the verification means 522 is shown in FIG. 16, any given node 52 may include the request means 521, and another node 52 may include the verification means 522.

Further, as shown in FIG. 16, in the information verification system 500, at least one of the nodes 51 may include a response means 511 and the search means 512. Note that although an example where one node 51 includes the response means 511 and the search means 512 is shown in FIG. 16, any given node 51 may include the response means 511, and another node 51 may include the search means 512.

The response means 511 (for example, the external-oriented information sharing unit 101) transmits, as response information that is a response to a request signal transmitted from any one of the nodes 52 included in the second node group 520, information including a nonce set to cause the response information to satisfy the rule, desired information or a digest of the desired information, and verification information included in the request signal to the node 52 that is a request source.

The search means 512 (for example, the drawing execution unit 104) searches for a nonce value that satisfies the rule using a one-way function.

Note that each of the above exemplary embodiments can also be described as the following supplementary notes.

(Supplementary note 1) An information verification device configured to determine reliability of information managed by a first node group including a plurality of nodes includes a verification means configured to verify response information that is information transmitted from any one of the nodes included in the first node group in response to a request signal transmitted to at least any node of the first node group, the request signal being for requesting information and including verification information that is information for use in verification to be generated each time the request signal is transmitted, the verification means determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and at least the information verification device, and a response time that is a time taken between the transmission of the request signal and the obtainment of the desired information, and on the basis of the determination results thereof, assessing the presence or absence of reliability of the desired information or the degree of reliability thereof.

(Supplementary note 2) In the information verification device described in Supplementary note 1, the request means transmits a request signal for requesting identical information a plurality of times to the at least any node of the first node group, and the verification means assesses the presence or absence of reliability of the desired information or the degree of reliability thereof on the basis of the determination results for the plurality of times.

(Supplementary note 3) The information verification device described in Supplementary note 1 or Supplementary note 2 is implemented as a ledger management node of a distributed ledger system or as a node capable of accessing a distributed ledger managed by the ledger management node, and the request means transmits a request signal including verification information generated on the basis of information included in the distributed ledger, and the verification means determines, regarding the response information directly received from any node of the first node group or indirectly received via another node of the second node group, whether verification information included in the response information is legitimate on the basis of whether the verification information is generated on the basis of the information included in the distributed ledger, and determines the response time on the basis of from which generation of information in the distributed ledger the verification information included in the response information is generated and a number of ledgers added to the distributed ledger in a time from the generation of the information to at least reception of the response information.

(Supplementary note 4) An information verification method of causing a node included in a second node group different from a first node group including a plurality of nodes to determine reliability of information managed by the first node group includes causing the node included in the second node group to verify response information that is information transmitted from any one of the nodes included in the first node group in response to a request signal transmitted to at least any node of the first node group, the request signal being for requesting information and including verification information that is information for use in verification to be generated each time the request signal is transmitted. In the verifying response information, determinations are made of whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessment is made of the presence or absence of reliability of the desired information or the degree of reliability thereof.

(Supplementary note 5) According to the information verification method described in Supplementary note 4, a request signal for requesting identical information is transmitted a plurality of times to the at least any node of the first node group, and an assessment is made of the presence or absence of reliability of the desired information or the degree of reliability thereof on the basis of the determination results for the plurality of times.

(Supplementary note 6) According to the information verification method described in Supplementary note 4 or Supplementary note 5, a node included in the second node group including a plurality of nodes each implemented as a ledger management node of a distributed ledger system or as a node capable of accessing a distributed ledger managed by the ledger management node transmits a request signal including verification information generated on the basis of information included in the distributed ledger, and determines, regarding the response information directly received from any node of the first node group or indirectly received via another node of the second node group, whether verification information included in the response information is legitimate on the basis of whether the verification information is generated on the basis of the information included in the distributed ledger, and determines the response time on the basis of from which generation of information in the distributed ledger the verification information included in the response information is generated and a number of ledgers added to the distributed ledger in a time from the generation of the information to at least reception of the response information.

(Supplementary note 7) An information verification program of causing a node included in a second node group different from a first node group including a plurality of nodes to determine reliability of information managed by the first node group causes a computer included in the node included in the second node group to execute verification processing of verifying response information that is information transmitted from any one of the nodes included in the first node group in response to a request signal transmitted to at least any node of the first node group, the request signal being for requesting information and including verification information that is information for use in verification to be generated each time the request signal is transmitted. In the verification processing, regarding the response information, determinations are made of whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, and on the basis of the determination results thereof, assessment is made of the presence or absence of reliability of the desired information or the degree of reliability thereof.

(Supplementary note 8) The information verification program described in Supplementary note 7 causes the computer to execute request processing of transmitting the request signal to at least any node of the first node group.

(Supplementary note 9) The information verification program described in Supplementary note 8 causes the computer to transmit a request signal for requesting identical information to at least any node of the first node group during execution of the request processing and to assess the presence or absence of reliability of the desired information or the degree of reliability thereof on the basis of the determination results for the plurality of times.

(Supplementary note 10) The information verification program described in Supplementary note 8 or Supplementary note 9 causes a computer included in a node included in the second node group including a plurality of nodes each implemented as a ledger management node of a distributed ledger system or as a node capable of accessing a distributed ledger managed by the ledger management node to transmit a request signal including verification information generated on the basis of information included in the distributed ledger during execution of the request processing, and to determine, regarding the response information directly received from any node of the first node group or indirectly received via another node of the second node group, whether verification information included in the response information is legitimate on the basis of whether the verification information is generated on the basis of the information included in the distributed ledger and determine the response time on the basis of from which generation of information in the distributed ledger the verification information included in the response information is generated and a number of ledgers added to the distributed ledger in a time from the generation of the information to at least reception of the response information during execution of the determination processing.

Although the invention of the present application has been described with reference to the exemplary embodiments and examples, the invention of the present application is not limited to the exemplary embodiments and examples. Various changes that can be understood by those skilled in the art can be made to the configuration and details of the invention of the present application within the scope of the invention of the present application.

INDUSTRIAL APPLICABILITY

The present invention is suitably applicable to a case of evaluating reliability of information retrieved by a node that is not included in any node group that holds the information.

REFERENCE SIGNS LIST 100, 200, 500 Information verification system
10 Verification node group
1 Verification node
1' GW verification node
101 External-oriented information sharing unit
102 Inter-verification node information sharing unit
103 Block generation unit
104 Drawing execution unit
105 Information verification unit
106 Information storage unit
2 Information retrieval node
2' GW information retrieval node
201 Information request unit
202 Verification information generation unit
203 Information verification unit
204 Information storage unit
205 Distributed ledger processing unit
20 Information retrieval node group
510 First node group
511 Response means
512 Search means
520 Second node group
521 Request means
522 Verification means 51, 52 Node
1000 Computer
1001 CPU
1002 Primary storage device
1003 Secondary storage device
1004 Interface
1005 Display device

The invention claimed is:

1. An information verification system comprising:
a first node group including a plurality of nodes, and a second node group including at least one node, wherein
the at least one of nodes included in the second node group includes:
at least one first memory configured to store first instructions; and
at least one first hardware processor configured to execute the first instructions to control:
a request unit to transmit a request signal for requesting information, the request signal including verification information that is information for use in verification to be generated each time the request signal is transmitted, to at least any node of the first node group, and
a verification unit to verify response information that is information transmitted from any one of the nodes included in the first node group in response to the request signal, the verification unit determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, the response time corresponding to from which generation of information in the distributed ledger the verification information included in the response information is generated, a number of ledgers added to the distributed ledger, and at least reception of the desired information, and on the basis of the determination results thereof, assessing the presence or absence of reliability of the desired information or the degree of reliability thereof, and
the at least one of the nodes included in the first node group includes:
at least one second memory configured to store second instructions; and
at least one second hardware processor configured to execute the second instructions to control:
a response unit to transmit, as the response information that is a response to the request signal transmitted from any node included in the second node group, information including a nonce set to cause the response information to satisfy the rule, the desired information or the digest thereof, and the verification information included in the request signal to a node that is a request source; and
a search unit to search for, using a one-way function, a value of the nonce that satisfies the rule.

2. The information verification system according to claim 1, wherein the at least one first hardware processor is further configured to execute the first instructions to control:
the request unit to transmit a request signal for requesting identical information a plurality of times to the at least any node of the first node group, and
the verification unit to assess the presence or absence of reliability of the desired information or the degree of reliability thereof on the basis of the determination results for the plurality of times.

3. The information verification system according to claim 2, wherein
the rule is specified by the verification information included in the request signal.

4. The information verification system according to claim 3, wherein
the rule is defined on the basis of attribute information on the desired information.

5. The information verification system according to claim 2, wherein
the rule is defined on the basis of attribute information on the desired information.

6. The information verification system according to claim 1, wherein
the rule is specified by the verification information included in the request signal.

7. The information verification system according to claim 6, wherein
the rule is defined on the basis of attribute information on the desired information.

8. The information verification system according to claim 1, wherein
the rule is defined on the basis of attribute information on the desired information.

9. The information verification system according to claim 1, wherein the at least one first hardware processor is further configured to execute the first instructions to control:
the verification unit to determine the response time on the basis of attribute information on the desired information.

10. The information verification system according to claim 1, wherein
the second node group includes a plurality of nodes each implemented as a ledger management node of a distributed ledger system or as a node capable of accessing a distributed ledger managed by the ledger management node, and
the at least one first hardware processor is further configured to execute the first instructions to control:
the request unit to transmit a request signal including verification information generated on the basis of information included in the distributed ledger, and
the verification unit to determine, regarding the response information directly received from any node of the first node group or indirectly received via another node of the second node group, whether verification information included in the response information is legitimate on the basis of whether the verification information is generated on the basis of the information included in the distributed ledger, and determine the response time on the basis of from which generation of information in the distributed ledger the verification information included in the response information is generated and a number of ledgers added to the distributed ledger in a time from the generation of the information to at least reception of the response information.

11. An information verification device configured to determine reliability of information managed by a first node group including a plurality of nodes, the information verification device comprising:

at least one first memory; and at least one first hardware processor configured to control a verification unit to verify response information that is information transmitted from any one of the nodes included in the first node group in response to a request signal transmitted to at least any node of the first node group, the request signal being for requesting information and including verification information that is information for use in verification to be generated each time the request signal is transmitted, the verification unit determining, regarding the response information, whether or not desired information that is information requested by the request signal or a digest thereof is included, whether or not correct verification information is included, whether or not a value obtained by applying a one-way function to the response information satisfies a predetermined rule defined for common use between the first node group and at least the information verification device, and a response time that is a time taken between the transmission of the request signal and the obtainment of the desired information, the response time corresponding to from which generation of information in the distributed ledger the verification information included in the response information is generated, a number of ledgers added to the distributed ledger, and at least reception of the desired information, and on the basis of the determination results thereof, assessing the presence or absence of reliability of the desired information or the degree of reliability thereof, wherein the at least one of the nodes included in the first node group includes:

at least one second memory; and at least one second hardware processor configured to control:

a response unit to transmit, as the response information that is a response to the request signal transmitted from the information verification device, information including a nonce set to cause the response information to satisfy the rule, the desired information or the digest thereof, and the verification information included in the request signal to a node that is a request source; and a search unit to search for, using a one-way function, a value of the nonce that satisfies the rule.

12. An information verification method of causing a node included in a second node group different from a first node group including a plurality of nodes to determine reliability of information managed by the first node group, the information verification method comprising:

causing the node included in the second node group to verify response information that is information transmitted from any one of the nodes included in the first node group in response to a request signal transmitted to at least any node of the first node group, the request signal being for requesting information and including verification information that is information for use in verification to be generated each time the request signal is transmitted, wherein in the verifying response information, determinations are made of whether or not desired information that is information requested by the request signal or a digest thereof is included, whether or not correct verification information is included, whether or not a value obtained by applying a one-way function to the response information satisfies a predetermined rule defined for common use between the first node group and the second node group, and a response time that is a time taken between the transmission of the request signal and the obtainment of the desired information, the response time corresponding to from which generation of information in the distributed ledger the verification information included in the response information is generated, a number of ledgers added to the distributed ledger, and at least reception of the desired information, and on the basis of the determination results thereof, assessment is made of the presence or absence of reliability of the desired information or the degree of reliability thereof;

causing the node included in the first node group to transmit, as the response information that is a response to the request signal transmitted from any node included in the second node group, information including a nonce set to cause the response information to satisfy the rule, the desired information or the digest thereof, and the verification information included in the request signal to a node that is a request source; and causing the node included in the first node group to search for, using a one-way function, a value of the nonce that satisfies the rule.

* * * * *